United States Patent
Nakami et al.

(10) Patent No.: US 7,375,848 B2
(45) Date of Patent: May 20, 2008

(54) OUTPUT IMAGE ADJUSTMENT METHOD, APPARATUS AND COMPUTER PROGRAM PRODUCT FOR GRAPHICS FILES

(75) Inventors: Yoshihiro Nakami, Nagano-ken (JP); Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1088 days.

(21) Appl. No.: 10/051,805

(22) Filed: Jan. 15, 2002

(65) Prior Publication Data

US 2002/0140693 A1    Oct. 3, 2002

(30) Foreign Application Priority Data

| Jan. 17, 2001 | (JP) | ............................. | 2001-008866 |
| Mar. 15, 2001 | (JP) | ............................. | 2001-074671 |
| Aug. 21, 2001 | (JP) | ............................. | 2001-249912 |

(51) Int. Cl.
  *H04N 1/40*    (2006.01)

(52) U.S. Cl. ........................................ 358/1.9; 258/406

(58) Field of Classification Search ................. 358/1.9, 358/2.1, 406, 504; 382/162, 168
See application file for complete search history.

(56) References Cited

U.S. PATENT DOCUMENTS

| 4,792,847 A | 12/1988 | Shimazaki et al. |
| 5,495,349 A | 2/1996 | Ikeda |
| 6,011,547 A | 1/2000 | Shiota et al. |
| 6,229,625 B1 | 5/2001 | Nakatsuka |
| 6,273,535 B1 | 8/2001 | Inoue et al. |

2003/0193598 A1    10/2003    Takemura

FOREIGN PATENT DOCUMENTS

| EP | 0 757 473 | 2/1997 |
| EP | 0 838 939 | 4/1998 |
| JP | 06-008537 | 1/1994 |
| JP | 09-219817 | 8/1997 |
| JP | 10-191246 | 7/1998 |
| JP | 10-226139 | 8/1998 |
| JP | 11-027535 | 1/1999 |
| JP | 11-041622 | 2/1999 |
| JP | 11-088672 | 3/1999 |
| JP | 11-127415 | 5/1999 |
| JP | 11-150656 | 6/1999 |

(Continued)

OTHER PUBLICATIONS

Abstract of Japanese Patent Publication 10-226139, Pub. Date: Aug. 25, 1998, Patent Abstracts of Japan.

(Continued)

*Primary Examiner*—Thomas D. Lee
*Assistant Examiner*—Stephen Brinich
(74) *Attorney, Agent, or Firm*—Martine Penilla & Gencarella, LLP

(57) ABSTRACT

When a memory card MC is inserted into slot, a control circuit of a color printer acquires and analyzes graphics processing control information GC from the memory card MC. A CPU corrects standard values for image quality parameters indicating graphics data qualities, to reflect the graphics processing control information GC. The CPU corrects image quality parameters to bring them into approximation with the corrected standard values, and adjusts image quality of the graphics data to reflect the corrected image quality parameters.

50 Claims, 18 Drawing Sheets

FOREIGN PATENT DOCUMENTS

| | | |
|---|---|---|
| JP | 11-239269 | 8/1999 |
| JP | 11-298848 A | 10/1999 |
| JP | 11-327605 | 11/1999 |
| JP | 11-331596 | 11/1999 |
| JP | 2000-013718 | 1/2000 |
| JP | 2000-137806 | 5/2000 |
| JP | 2000-278598 | 10/2000 |
| JP | 2001-147481 | 5/2001 |

OTHER PUBLICATIONS

Abstract of Japanese Patent Pub. No. 10-191246, Pub. Date: Jul. 21, 1998, Patent Abstracts of Japan.

Abstract of Japanese Patent Pub. No. 11-331596, Pub. Date: Nov. 30, 1999, Patent Abstracts of Japan.

Abstract of Japanese Patent Pub. No. 2000-137806, Pub. Date: May 16, 2000, Patent Abstracts of Japan.

Abstract of Japanese Patent Publication No. 06-008537, Pub. Date: Jan. 18, 1994, Patent Abstracts of Japan.

Abstract of Japanese Patent Publication No. 09-219817, Pub. Date: Aug. 19, 1997, Patent Abstracts of Japan.

Abstract of Japanese Patent Publication No. 11-041622, Pub. Date: Feb. 12, 1999, Patent Abstracts of Japan.

Abstract of Japanese Patent Publication No. 11-088672, Pub. Date: Mar. 30, 1999, Patent Abstracts of Japan.

Abstract of Japanese Patent Publication No. 11-127415, Pub. Date: May 11, 1999, Patent Abstracts of Japan.

Abstract of Japanese Patent Publication No. 2000-013718, Pub. Date: Jan. 14, 2000, Patent Abstracts of Japan.

Abstract of Japanese Patent Publication No. 2001-147481, Pub. Date: May 29, 2001, Patent Abstracts of Japan.

Abstract of Japanese Patent Publication No. 11-327605, Pub. Date: Nov. 26, 1999, Patent Abstracts of Japan.

Abstract of Japanese Patent Publication No. 2000-278598, Pub. Date: Oct. 6, 2000, Patent Abstracts of Japan.

Abstract of Japanese Patent Publication No. 11-150656, Pub. Date: Jun. 2, 1999, Patent Abstracts of Japan.

Abstract of Japanese Patent Publication No. 11-027535, Pub. Date: Jan. 29, 1999, Patent Abstracts of Japan.

Abstract of Japanese Patent Publication No. 11-239269, Pub. Date: Aug. 31, 1999, Patent Abstracts of Japan.

| TAG NAME | PARAMETER VALUE |
|---|---|
| EXPOSURE TIME | 1/137 SEC |
| LENS F NUMBER | F10. 1 |
| EXPOSURE BIAS VALUE | EV0. 4 |
| MIN. F VALUE | F2. 0 |
| LENS FOCAL DISTANCE | 20. 70(mm) |
| COLOR SPACE INFORMATION | sRGB |
| PICTURE MODE | 1 |
| AUTO ADJUST LEVEL | 5 |

112 APPENDED DATA STORAGE AREA

Fig.16

| MODE | CONTRAST | BRIGHTNESS | COLOR BALANCE | SATURATION | SHARPNESS | COLOR CAST | NOISE REDUCTION |
|---|---|---|---|---|---|---|---|
| 1 | STANDARD | STANDARD | STANDARD | STANDARD | STANDARD | OFF | OFF |
| 2 | MOD. SOFT | MOD. BRIGHT | STANDARD | MOD. LOW | MOD. LOW | SKIN COLOR | OFF |
| 3 | MOD. HARD | STANDARD | STANDARD | MOD. HIGH | MOD. HIGH | SKY/GREEN | OFF |
| 4 | STANDARD | DARK | OFF | STANDARD | MOD. LOW | RED | ON |
| 5 | STANDARD | DARK | OFF | STANDARD | STANDARD | OFF | ON |
| 6 | MOD. SOFT | MOD. BRIGHT | WEAK | MOD. HIGH | STANDARD | GREEN | OFF |
| 7 | STANDARD | STANDARD | WEAK | STANDARD | HIGH | OFF | OFF |
| 8 | HARD | STANDARD | STANDARD | MOD. HIGH | HIGH | OFF | OFF |
| 9 | MOD. SOFT | BRIGHT | STANDARD | HIGH | STANDARD | OFF | OFF |
| 10 | STANDARD | STANDARD | STANDARD | STANDARD | MOD. HIGH | OFF | OFF |
| 11 | STANDARD | MOD. BRIGHT | STANDARD | STANDARD | MOD. HIGH | SKIN COLOR | OFF |

| IMAGE QUALITY PARAMETER | AP | MP | FP | FP' |
|---|---|---|---|---|
| BRIGHTNESS | 16 | 10 | 26 | 42 |
| SHARPNESS | 5 | −10 | −5 | 0 |

Fig.21

$$\begin{pmatrix} R \\ G \\ B \end{pmatrix} = \mathsf{S} \begin{pmatrix} Y \\ Cb - 128 \\ Cr - 128 \end{pmatrix}$$

$$\mathsf{S} = \begin{pmatrix} 1 & 0 & 1.40200 \\ 1 & -0.34414 & -0.71414 \\ 1 & 1.77200 & 0 \end{pmatrix}$$

Fig.22

$$\begin{pmatrix} X \\ Y \\ Z \end{pmatrix} = \mathsf{M} \begin{pmatrix} Rt' \\ Gt' \\ Bt' \end{pmatrix} \qquad \mathsf{M} = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geqq 0$ $$Rt' = \left(\frac{Rt}{255}\right)^{\gamma} \qquad Gt' = \left(\frac{Gt}{255}\right)^{\gamma} \qquad Bt' = \left(\frac{Bt}{255}\right)^{\gamma}$$

$Rt, Gt, Bt < 0$ $$Rt' = -\left(\frac{-Rt}{255}\right)^{\gamma} \qquad Gt' = -\left(\frac{-Gt}{255}\right)^{\gamma} \qquad Bt' = -\left(\frac{-Bt}{255}\right)^{\gamma}$$

Fig.23

$$\begin{pmatrix} Rw \\ Gw \\ Bw \end{pmatrix} = \mathsf{N}^{-1} \begin{pmatrix} X \\ Y \\ Z \end{pmatrix}$$

$$\mathsf{N}^{-1} = \begin{pmatrix} 3.30572 & -1.77561 & 0.73649 \\ -1.04911 & 2.1694 & -1.4797 \\ 0.0658289 & -0.241078 & 1.24898 \end{pmatrix}$$

$$Rw' = \left(\frac{Rw}{255}\right)^{1/r} \qquad Gw' = \left(\frac{Gw}{255}\right)^{1/r} \qquad Bw' = \left(\frac{Bw}{255}\right)^{1/r}$$

OUTPUT IMAGE ADJUSTMENT METHOD, APPARATUS AND COMPUTER PROGRAM PRODUCT FOR GRAPHICS FILES

BACKGROUND OF THE INVENTION

1. Field of the Invention

The present invention relates to image quality adjusting apparatuses, computer program product and methods for adjusting image quality of graphics files.

2. Discussion of the Background

Image quality of graphics data produced by digital still cameras (DSC) and digital video cameras (DVC), scanners and similar devices can be adjusted as desired using a graphics retouching application run on a personal computer. Graphics retouching applications typically have an image adjustment function whereby image quality of graphics data is adjusted automatically. Using this image adjustment function, it is fairly easy to improve the image quality of graphics data output from an output device. Known output devices for graphics files include CRTs, LCDs, printers, projectors, and television receivers, for example.

Printer drivers, which control the operation of one type of output device —namely, a specific printer—also typically have a function for automatically adjusting image quality of graphics data. It is easy to improve the image quality of printed graphics data using such printer drivers as well.

However, the automatic image adjustment function provided by graphics retouching applications or printer drivers performs image quality correction on the basis of graphics data having typical image quality properties. As recognized by the present inventors, graphics data being processed, on the other hand, is generated under a variety of conditions, and thus image quality cannot always improved by a standard automatic image adjustment function, even where the image quality parameter values of the graphics data are modified using standard values.

Certain DSCs and other graphics data generating devices allow the image quality of graphics data to be adjusted in a desired manner when graphics data is created, thereby enabling the user to produce graphics data having certain desired image qualities. Alternatively, a user may be able to produce graphics data adapted to a certain photographic condition by way of photographic image qualities predetermined for the photographic condition. If the automatic image adjustment function is performed on such graphics data, the result is that the intentionally created image quality is also adjusted automatically to standard image quality, so that the automatic image quality adjustment does not reflect the intent of the user. Another problem is that automatic image quality adjustment tends not to preserve photographic condition settings made on the DSC end. This problem is not unique to DSCs, but is shared by other graphics file generating devices such as DVCs.

SUMMARY OF THE INVENTION

With the foregoing in view, it is an object of the present invention to overcome the above-identified and other limitations with conventional systems and methods and provide a way to automatically adjust image quality appropriately for individual sets of graphics data.

It is a further object to provide a way to automatically adjust image quality without eliminating intentionally set mage quality adjustment conditions.

The present invention, in a first aspect thereof, addresses this problem by providing a graphics processing device for graphics processing on graphics data with graphics processing control information for use during image quality correction of graphics data, the graphics processing control information being related to the graphics data, the device including: an image quality properties acquiring mechanism for analyzing the graphics data and acquiring image quality property information that indicates a property pertaining to the image quality of the graphics data; and an image quality adjusting mechanism for adjusting the image quality of the graphics data on the basis of the graphics processing control information and the acquired image quality property information According to the graphics processing device of this first aspect, image quality of graphics data is adjusted so as to reflect graphics processing control information used during adjustment of image quality of graphics data and image quality property information of the acquired graphics data, whereby automatic adjustment of image quality may be performed in a manner appropriate for individual sets of graphics data. Additionally, image quality of graphics data can be automatically adjusted without eliminating intentionally set graphics processing control information.

In the graphics processing device according to the first aspect herein, the image quality property information may consist of combination of a plurality of image quality parameter values indicating image quality properties of the graphics data, with image quality adjustment by the image quality adjusting mechanism being performed by adjusting the image quality of the graphics data so as to reflect the graphics processing control information. With this arrangement, graphics data image quality can be adjusted to directly reflect graphics processing control information.

In the graphics processing device according to the first aspect herein, the image quality property information may consist of a combination of a plurality of image quality parameter values indicating image quality properties of the graphics data, with the image quality adjusting mechanism having standard image quality parameter values serving as a basis for image quality adjustment, a standard value being predetermined for each of the image quality parameter values, and with image quality adjustment by the image quality adjusting mechanism being performed by calculating, on the basis of the standard image quality parameter values and the image quality parameter values, a level of correction for correcting the graphics data, increasing or decreasing the level of correction on the basis of the result of analysis of the graphics processing control information, and adjusting the graphics data to reflect the increased or decreased level of correction. With this arrangement, the image quality of graphics data can be brought into approximation or matched with image quality adjustment standards so as to adjust and improve the image quality of graphics data to indirectly reflect graphics processing control information.

In the graphics processing device according to the first aspect herein, the increase or decrease of the level of correction made on the basis of the result of analysis of the graphics processing control information can be performed by correcting the standard image quality parameter values on the basis of the result of analysis of the graphics processing control information, or by determining an appropriate level of correction on the basis of the result of analysis of the graphics processing control information. With the former arrangement, standard image quality parameter values—which serve as indices for adjusting image quality parameter values—can be corrected, so that image quality adjustment to be performed without any loss of properties of individual sets of graphics data. With the latter arrangement, an appropriate level of correction can be determined on the basis of the result of analysis of the graphics processing control information, so that image quality adjustment to be performed without eliminating properties of individual sets of graphics data.

In a second aspect, the invention provides a graphics processing device for graphics processing on graphics data with standard image quality information related to the graphics data and serving as a basis for image quality correction of graphics data. The graphics processing device of this second aspect includes: an image quality parameter value acquiring mechanism for analyzing the graphics data and acquiring an image quality parameter value that indicates an image quality property of the graphics data; a standard parameter value information acquiring mechanism for acquiring a standard image quality parameter value predetermined for the image quality parameter, on the basis of the standard image quality information; and an image quality adjusting mechanism for adjusting the image quality of the graphics data on the basis of the acquired standard image quality parameter value and the acquired image quality parameter value.

According to the graphics processing device of this second aspect, a standard image quality parameter value—which serves as an index for image quality adjustment on the basis of standard image quality information used during image quality correction of graphics data—can be acquired, and image quality of the graphics data can be adjusted on the basis of this acquired standard image quality parameter value, and the acquired image quality parameter value, whereby automatic adjustment of image quality may be performed appropriately for individual sets of graphics data. Additionally, image quality of graphics data can be automatically adjusted without eliminating intentionally set graphics processing control information. Further, a standard image quality parameter value serving as an index for image quality adjustment can be acquired on the basis of standard image quality information, whereby the standard image quality parameter value can be acquired easily.

In a third aspect, the invention provides a graphics processing device for graphics processing using graphics data and graphics processing control information for use during image quality correction of graphics data, the graphics processing control information being related to the graphics data. The graphics processing device of this third aspect includes: an image quality parameter value acquiring mechanism for analyzing the graphics data and acquiring an image quality parameter value that indicates an image quality property of the graphics data; a standard image quality parameter value correcting mechanism for analyzing the graphics processing control information, and on the basis of the result of the analysis correcting a standard image quality parameter value predetermined for the image quality parameter; and an image quality adjusting mechanism for adjusting the image quality of the graphics data on the basis of the corrected standard image quality parameter value and the acquired image quality parameter value.

According to the graphics processing device of this third aspect, a standard image quality parameter value—which serves as an index for image quality adjustment—is corrected, and the image quality of graphics data is adjusted on the basis of the corrected standard image quality parameter value, and an image quality parameter value, whereby automatic adjustment of image quality may be performed appropriately for individual sets of graphics data. Additionally, image quality of graphics data can be automatically adjusted without loss of intentionally set graphics processing control information.

In a graphics processing device pertaining to any of the first to third aspects, standard image quality parameter values may consist of a combination of parameter values selected from a plurality of values for the acquired image quality parameter values, on the basis of the graphics processing control information. The graphics processing control information may include correction information for at least one item of information relating to contrast, brightness, color balance, saturation, sharpness, memory color, and noise reduction. The graphics processing control information may be stored in Exif maker note area of the graphics file.

In a fourth aspect, the invention provides an output device for outputting graphics data related to graphics processing control information for use during image quality correction of graphics data. The output device according to this fourth aspect includes: the graphics processing device according to any of the first to third aspects of the invention; and a graphics data output mechanism for outputting graphics data subjected to graphics processing by the graphics processing device.

According to the graphics processing device of this fourth aspect, adjustment of image quality may be performed appropriately for individual sets of graphics data, to reflect graphics processing control information used during adjustment of image quality of the graphics data, and the acquired graphics data image quality property information. Additionally, the image quality-adjusted graphics data can be output without eliminating intentionally set graphics processing control information.

In a fifth aspect, the invention provides a program for performing image quality adjustment of graphics data using graphics processing control information for use during image quality correction of graphics data, the graphics processing control information being related to the graphics data. The program according to this fifth aspect executes by way of a computer: a function for analyzing the graphics data and acquiring an image quality parameter value that indicates image quality properties of the graphics data; a function for analyzing the graphics processing control information, and on the basis of the result of the analysis correcting a standard image quality parameter value predetermined for the image quality parameter; and a function for adjusting the image quality of the graphics data on the basis of the corrected standard image quality parameter value and the acquired image quality parameter value.

In a sixth aspect, the invention provides a graphics data generating device for use in an output device that outputs graphics data subjected to image quality adjustment processing. The graphics data generating device according to this sixth embodiment includes: a graphics data input mechanism for inputting graphics data for output by the output device; an image quality adjustment processing condition designating mechanism for designating a condition for image quality adjustment processing of the graphics data performed by the output device; an image quality adjustment data generating mechanism for generating image quality adjustment data, on the basis of the designated condition for image quality adjustment processing; and a graphics data output mechanism for outputting input graphics data related to the image quality adjustment data.

According to the graphics data generating device of this sixth aspect, there can be generated graphics data related to image quality adjustment data designating conditions for image quality adjustment processing in a graphics processing device and an output device, whereby image quality adjustment data and graphics data can be associated appropriately, so that automatic adjustment of individual sets of graphics data can be performed easily. Since intentionally set image quality adjustment processing conditions and graphics can be associated, automatic adjustment of graphics data image quality can be made to reflect the image quality adjustment processing conditions.

In the graphics data generating device of this sixth aspect, the image quality adjustment data may consist of data for correcting a standard image quality parameter used as a basis for image quality adjustment processing in image quality adjustment processing by the output device. Where the image quality adjustment data is data for correcting a standard image quality parameter, the output device or graphics processing device can perform image quality adjustment processing after the image quality adjustment data has been analyzed to correct to the standard image quality parameters. The image quality adjustment data may consist of a standard image quality parameter value used as a standard value for image quality adjustment processing in image quality adjustment processing by the output device. Where image quality adjustment data is a standard image quality parameter value used, an output device or graphics processing device can perform image quality adjustment processing directly, using the standard image quality parameter, without performing a modification process. The image quality adjustment data may consist of a combination of a plurality of standard image quality parameter values corresponding to image quality parameters representing image quality of the graphics data, and used as standard values for image quality adjustment processing by the output device. Where image quality adjustment data consists of a combination of a plurality of standard image quality parameter values, standard image quality parameter values for specific photographic conditions may be combined.

In the graphics data generating device of this sixth aspect, the image quality adjustment data may consist of data for designating an appropriate level of correction for correcting the graphics data calculated on the basis of a standard image quality parameter value used as a standard value for image quality adjustment processing by the output device and an image quality parameter value representing image quality of the graphics data. With this arrangement, graphics data can be corrected according to a designated appropriate level of correction. Or, the image quality adjustment data may consist of data for designating a trend for correction of a plurality of standard image quality parameter values, corresponding to image quality parameters representing image quality of the graphics data, and used as standard values for image quality adjustment processing by the output device. Where image quality adjustment data consists of data designating a trend for correction of standard image quality parameter values, the output device or graphics processing device is able to perform correction on one or a plurality of standard image quality parameter values according to a designated trend, and to perform image quality adjustment processing on the basis of the corrected standard image quality parameter values. The image quality adjustment data may also include data designating trends for correction of standard image quality parameter values relating at least to contrast, brightness, color balance, saturation, sharpness, memory color, and noise reduction, for each the photographic condition.

In the graphics data generating device of this sixth aspect, the image quality adjustment processing condition designating mechanism may additionally include:
a display mechanism for displaying the image quality adjustment processing condition; and
a determining mechanism for selecting and determining the image quality adjustment processing condition.

In the graphics data generating device of this sixth aspect, the graphics data generating mechanism may stores the image data with the image quality adjustment data within one graphics file. The graphics data generating device of this sixth aspect may additionally include a graphics data generating mechanism for generating graphics data for output by the output device. With this arrangement it is possible to generate image quality adjustment data for the generated graphics data.

In a seventh aspect, the invention provides a program for generating a graphics data for use in an output device that outputs graphics data subjected to image quality adjustment processing. The program according to this seventh aspect executes by means of a computer: a function for acquiring graphics data for output by the output device; a function for designating a condition for image quality adjustment processing of the graphics data performed by the output device; a function for generating image quality adjustment data on the basis of the designated condition for image quality adjustment processing; a function for relating the acquired graphics data to graphics output control data; and a function for outputting the related graphics data.

The program according to this seventh aspect affords the same working effects as the graphics processing device according to the sixth aspect, and like the sixth aspect may be reduced to practice in a number of embodiments.

In an eighth aspect, the invention provides a graphics processing system for outputting graphics data from a graphics file that includes, in a single file, graphics data and graphics processing control information for use during image quality correction of graphics data. The graphics processing system according to this eighth aspect includes: a graphics data generating device including: graphics data acquiring mechanism for acquiring the graphics data; an image quality adjustment processing condition designating mechanism for designating a condition for image quality adjustment processing of the graphics data; an image quality adjustment data generating mechanism for generating image quality adjustment data on the basis of the designated condition for image quality adjustment processing; and a graphics file generating mechanism for generating a single graphics file that contains the acquired graphics data and graphics output control data; and a graphics processing device including: an image quality property information acquiring mechanism for analyzing the graphics data and acquiring image quality property information for the graphics data; and an image quality adjusting mechanism for adjusting the image quality of the graphics data to reflect the condition for image quality adjustment processing and the acquired image quality property information.

The graphics processing system of this eighth aspect affords the same working effects as both the first to fifth aspects, and the sixth and seventh aspects.

BRIEF DESCRIPTION OF THE DRAWINGS

FIG. 16 is an illustrative diagram showing exemplary combinations of picture mode, image quality parameters, and numerical values designating picture mode.

FIGS. 21-23 are descriptions of mathematical expressions used for describing conversion processes performed as part of the present invention.

DESCRIPTION OF THE PREFERRED EMBODIMENTS

A more complete understanding of the present invention will be gained through the following description of the embodiments in the order indicated below, making reference to the accompanying drawings.

The description that follows is arranged in the following 6 sections, A-F:

A. Arrangement of a graphics processing system
B. Arrangement of a graphics file
C. Arrangement of a graphics output device
D. Graphics processing in a digital still camera
E. Graphics processing in a printer
F. Other embodiments

A. Arrangement of a Graphics Processing System

Figure 1:
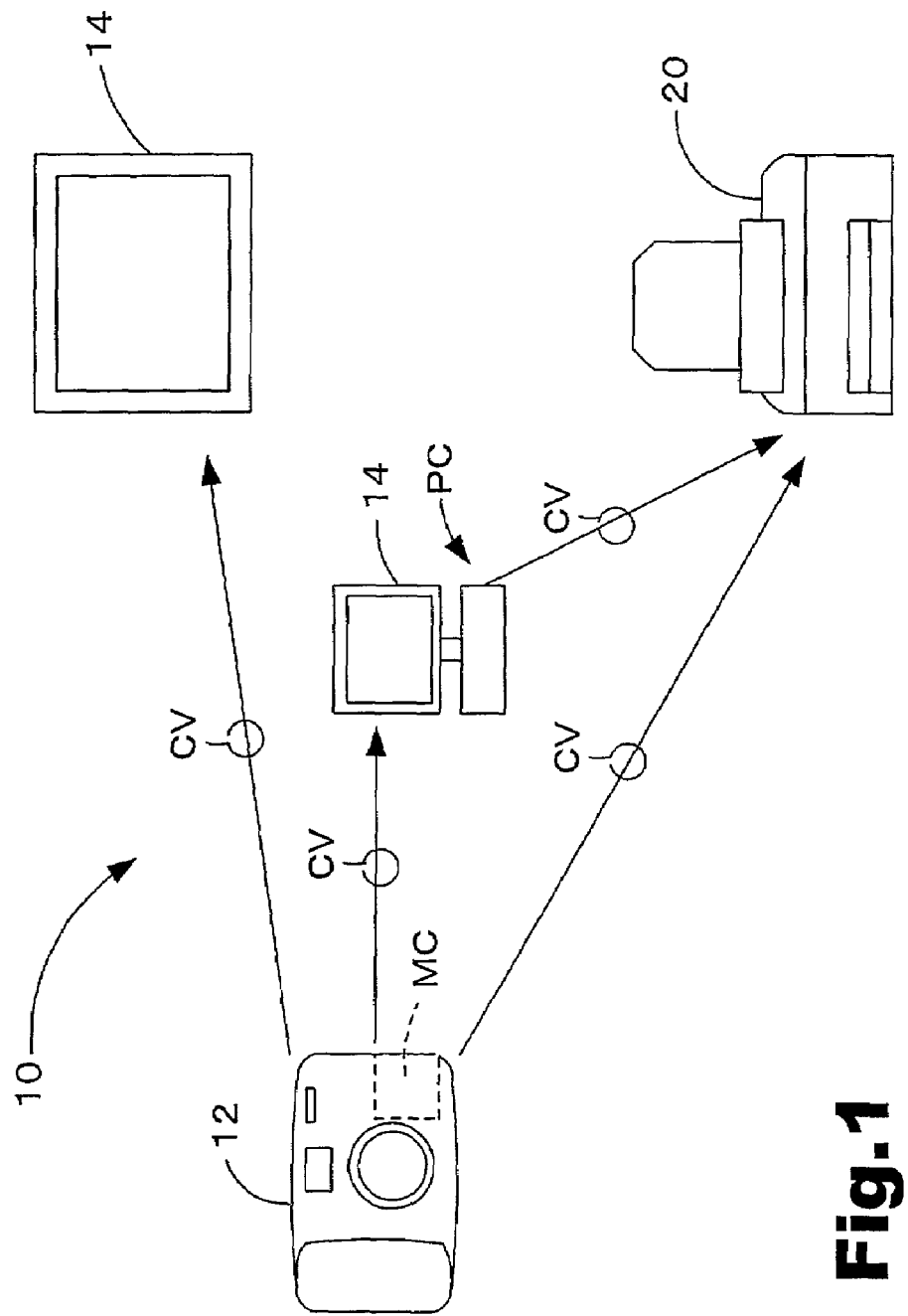
FIG. 1 is an illustrative diagram of an exemplary graphics processing system for implementing a graphics processing device which pertains to a first embodiment of the present invention.
Figure 2:
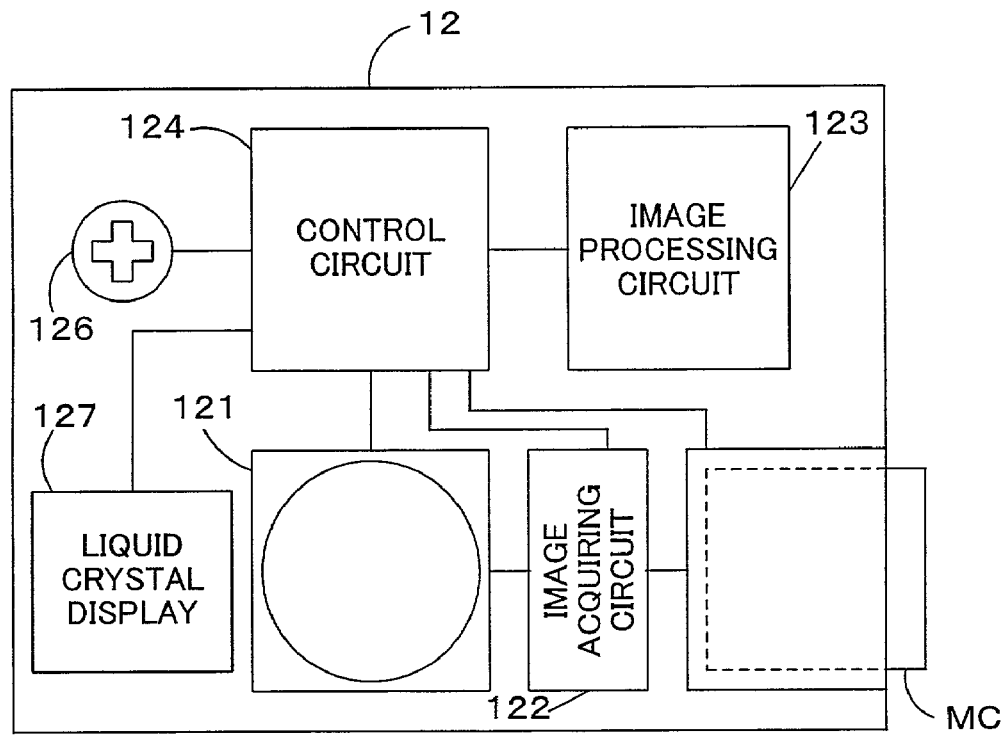
FIG. 2 is a block diagram showing a simplified arrangement for a digital still camera capable of generating a graphics file (graphics data) for output by a graphics processing device pertaining to the first embodiment.

The following description of the arrangement of a graphics processing system for implementing a graphics processing device which pertains to a first embodiment of the invention initially makes reference to FIGS. 1 and 2. FIG. 1 is an illustrative diagram of an exemplary graphics processing system for a graphics processing device which pertains to a first embodiment. FIG. 2 is a block diagram showing a simplified arrangement for a digital still camera capable of generating a graphics file (that holds graphics data) for output by a graphics processing device pertaining to the first embodiment.

The graphics processing system 10 herein includes a digital still camera 12 serving as an input device for generating a graphics file; and a color printer 20 serving as an output device for graphics processing and image output on the basis of a graphics file generated by digital still camera 12. While the output device could be a monitor 14 (e.g., a CRT display or LCD display), a projector, or the like rather than a printer 20, the following description uses the color printer 20 as an exemplary output device.

Digital still camera 12 acquires an image by means of imaging optical information with a digital device (e.g. a CCD or photomultiplier); as shown in FIG. 2 it includes an optical circuit 121 equipped with a CCD, etc. for gathering optical information; an image acquiring circuit 122 for controlling optical circuit 121 in order to acquire an image; an graphics processing circuit 123 for processing the acquired digital image; and a control circuit 124 for controlling the various circuits, and equipped with memory. The digital still camera 12 stores the acquired image as digital data in a storage device, namely, a memory card MC. The format for storing graphics data in a digital still camera 12 is typically the JPEG format, but other storage formats could be employed, such as TIFF, GIF, BMP, or RAW format.

Digital still camera 12 is provided with a Select/Set button 126 for setting brightness, contrast, exposure bias value, white balance, and other individual graphics processing control parameters, and for setting picture modes, each having a plurality of graphics processing control parameter value settings for a particular photographic condition; and with a liquid crystal display 127 for previewing photographed images and for setting the picture mode, etc., using the Select/Set button 126. A description of the processing of setting picture mode and image quality parameters using Select/Set button 126 and liquid crystal display 127 is provided hereinbelow.

The digital still camera 12 used in this graphics processing system 10 stores a graphics file GF—containing graphics data GD plus graphics processing control information GC for the graphics data—in a memory card MC. This graphics processing control information GC, together with graphics data GD created when the photo is taken, are automatically stored as a graphics file GF in memory card MC. Where the user has selected a picture mode suitable for a particular photographic condition—i.e., portrait, night, or evening—the graphics processing control information GC in the graphics file GF stored in memory card MC will include parameter values for the graphics processing control parameters for the selected picture mode, and where graphics processing control parameters—such as exposure bias value or white balance—have been individually set to desired values, the graphics processing control information GC will include settings for these set graphics processing control parameters.

Where a photograph is taken with digital still camera 12 in automatic picture mode, values for parameters that are set automatically when a picture is taken, such as exposure time, white balance, aperture, shutter speed, and lens focal distance, are treated as graphics processing control parameters, and a graphics GF containing these graphics processing control parameters is stored in memory card MC (or in a memory buffer if a wired, or wireless, communications link is used for transferring the data file from the DSC). Parameters for each picture mode and parameter values for these are held in memory in the control circuit 124 of digital still camera 12.

The graphics file GF generated by digital still camera 12 is sent to the color printer 20 via a cable CV and computer PC, or simply via a cable CV. Alternatively, the memory card MC on which the graphics file GF is stored in digital still camera 12 may be connected to printer 20 via a computer PC equipped with a memory card slot, or connected to printer 20 directly, to send the graphics file to printer 20. In the following description it is assumed that the memory card MC is connected directly to printer 20. The DSC 12 may also include an I/O port, such as a USB, IEEE 1394 port, or a wireless port, such as IR or RF, (e.g., Bluetooth compatible). When a "wired" communication channel is used (CV), such a coaxial cable, USB cable, or CAT 5 cable, for outputting the resulting image file, the propagated data signal is sent over the channel as an electric signal. When transmitted over a wireless channel, the propagated data signal is sent as an electromagnetic signal.

B. Arrangement of a Graphics File

Figure 3:
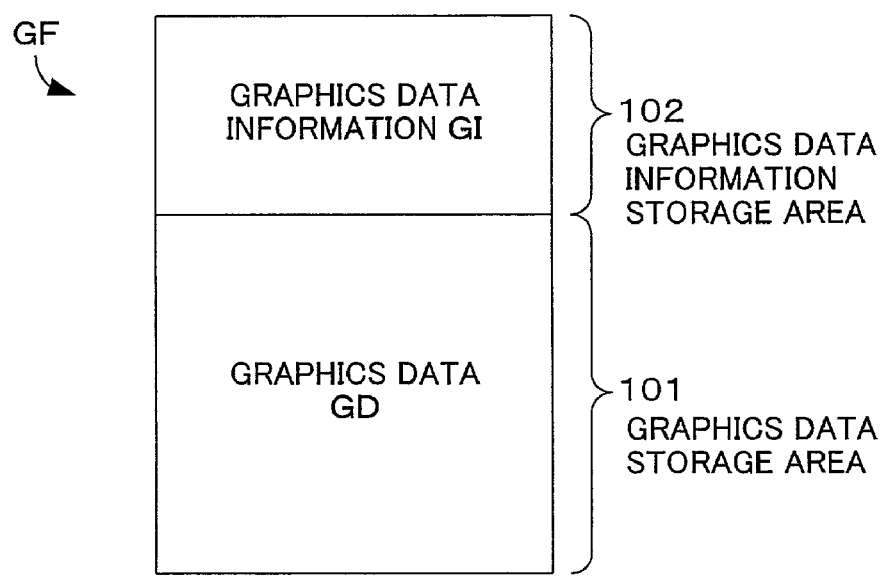
FIG. 3 is an illustrative diagram showing conceptually an exemplary internal structure for the graphics file employed in the first embodiment.

The following description of the general arrangement of a graphics file employed in the present embodiment makes reference to FIG. 3. FIG. 3 is an illustrative diagram showing conceptually an exemplary internal structure for the graphics file employed in the present embodiment. Graphics file GF contains a graphics data storage area 101 for storing graphics data GD, and a graphics processing control information storage area 102 for storing graphics processing control information (image quality adjustment processing conditions) GC for reference and application during automatic image quality adjustment of graphics data. Graphics data GD is stored, for example, in JPEG format, while graphics processing control information GC is stored in TIFF format. The terms "file structure," "data structured" and "storage area" in this working example mean a file or data field configured to hold a digital representation of an image when a file or data, etc. is stored within a certain storage range of a storage device.

Graphics processing control information GC designates graphics processing conditions to be used for graphics processing of graphics data generated by a digital still camera 12 or other graphics data generating device, and includes user-settable parameters such as those relating to exposure time, ISO speed, aperture, shutter speed and focal distance, as well as user-settable graphics processing control parameters such as exposure bias value, white balance, picture mode, and target color space. Or, where a picture mode has been designated by the user, the graphics processing control information GC may include a combination of graphics processing control parameters—set automatically when the picture is taken—that relate to a designated picture mode.

The graphics file GF in this embodiment can be generated by means of a digital still camera 12, or by a digital video camera, scanner, or other input device (graphics file generating device). Where generated by a digital video camera, the generated file may be either a still video file containing static graphics data and output control information, or a motion video file containing motion video data (in MPEG format, for example) and output control information. Where a motion video file is used, output control may be performed in response to output control information for some or all of the frames of the motion video.

The graphics file GF in the present embodiment basically includes the graphics data storage area 101 and graphics processing control information storage area 102 described above, and has a file structure in accordance with an existing standardized file format. Compatibility of graphics file GF in the present embodiment with existing standardized file formats is described more specifically herein below.

Figures 4, 5:
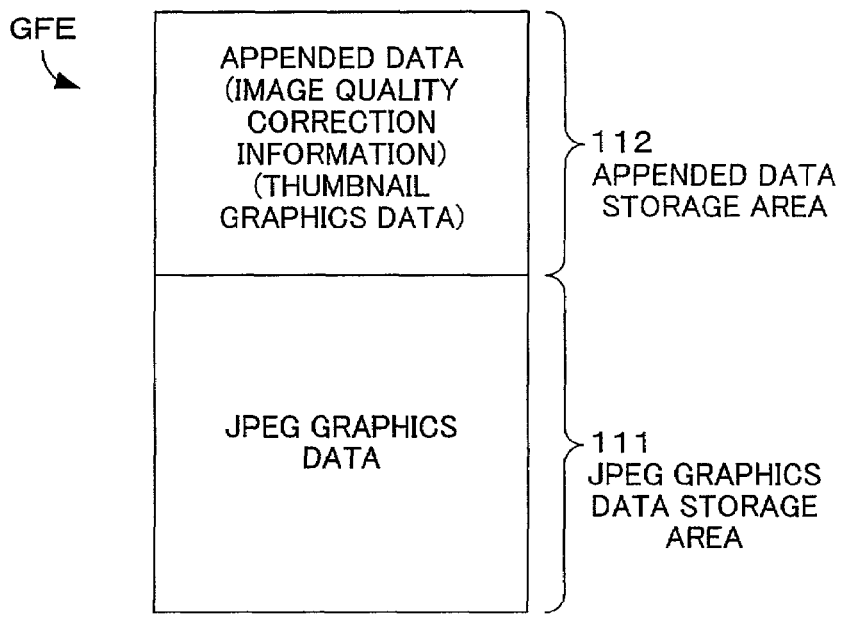
FIG. 4 is an illustrative diagram showing the general internal structure of a graphics file stored in the Exif file format.
FIG. 5 is an illustrative diagram of an exemplary data structure in the appended data storage area of a graphics file useable in the first embodiment.

The graphics file GF in the present embodiment has a file structure in accordance with the graphics file format specification for digital still cameras (Exif), for example. The Exif specification was developed by the Japan Electronics and Information Technologies Industries Association (JEITA). The following description of general structure in the file where the graphics file GF in the present embodiment has a file format in accordance with the Exif file format makes reference to FIG. 4. FIG. 4 is an illustrative diagram showing the general internal structure of a graphics file GF stored in the Exif file format.

The Exif file, i.e. graphics file GFE, contains a JPEG graphics data storage area 111 for storing graphics data in JPEG format, and an appended data storage area 112 for storing appended data of various kinds relating to the stored JPEG graphics data. The JPEG graphics data storage area 111 corresponds to the graphics data storage area 101 mentioned earlier, and the appended data storage area 112 corresponds to the graphics processing control information storage area 102 mentioned earlier. The appended data storage area 112 contains graphics processing control information GC (image quality adjustment processing conditions)—i.e., date & time stamp, exposure, shutter speed, white balance, exposure bias value, target color space, etc.—for reference when outputting a JPEG graphic. The appended data storage area 112 also contains, in TIFF format, thumbnail graphics data for the JPEG image stored in JPEG graphics data storage area 111. It is common knowledge to practitioners of the art that the Exif format uses tags to identify data of various kinds; on occasion data is referred to by its tag name.

The following description of the specifics of data structure in the appended data storage area 112 makes reference to FIG. 5. FIG. 5 is an illustrative diagram of an exemplary data structure in the appended data storage area 112 of a graphics file GF useable in the present embodiment.

As shown in the drawing, appended data storage area 112 contains parameter values for graphics processing control information GC, such as exposure time, lens F number, exposure control mode, ISO speed, exposure bias value, white balance, flash, focal distance, and picture mode, stored according to predetermined addresses or offset values. On the output device side, addresses or offset values can be designated for desired information (parameters) so that graphics processing control information GC can be acquired. Graphics processing control information GC is stored in an undefined area in appended data storage area 112, Exif maker note area freed up by the user.

C. Arrangement of Image Output Device

Figure 6:
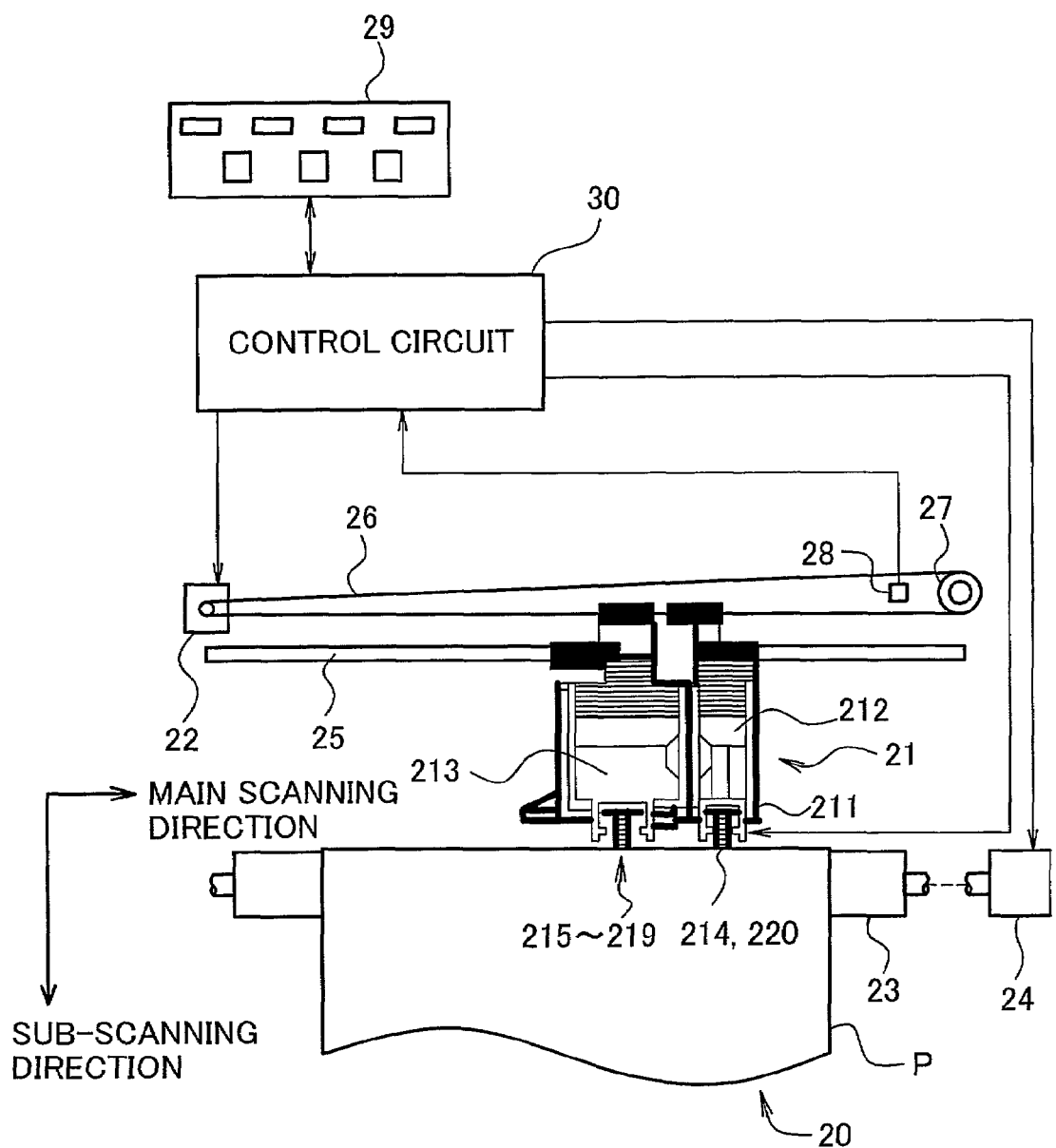
FIG. 6 is a block diagram showing the general arrangement of color printer 20 pertaining to the first embodiment.

The following description of the general arrangement of the image output device pertaining to this embodiment, namely, color printer 20, makes reference to FIG. 6. FIG. 6 is a block diagram showing the general arrangement of color printer 20 pertaining to this embodiment.

Color printer 20 is capable of color image output, for example, an ink-jet printer that forms images by jetting inks of four colors—for example, cyan (C), magenta (M), yellow (Y) and black (K)—onto a print medium to produce a dot pattern; or an electrophotographic printer that produces images by transferring and fixing color toner onto a print medium. Besides the four colors listed above, light cyan (LC), light magenta (LM), or dark yellow (DY)colored inks may also be used.

As shown in the drawing, color printer 20 includes a mechanism for driving a print head 211 conveyed on a carriage 21 as it projects ink to produce dots; a mechanism for producing, by means of a carriage motor 22, reciprocating motion of carriage 21 in the axial direction of a platen 23; a mechanism for advancing the printer paper P by means of a paper feed motor 24; and a control circuit 30. The mechanism for producing reciprocal motion of carriage 21 in the axial direction of platen 23 includes a slide rail 25 extending parallel to the axis of platen 23, for slidably retaining cartridge 21; a pulley 27 having an endless drive belt 26 operating between it and carriage motor 22; and a position sensor 28 for sensing the home position of carriage 21. The mechanism for advancing printer paper P includes a platen 23; a paper feed motor 24 for turning platen 23; an auxiliary paper feed roller (not shown), and a gear train (not shown) for transmitting the rotation of paper feed motor 24 to platen 23 and the auxiliary paper feed roller.

Control circuit 30 exchanges signals with the control panel 29 of the printer in order to control appropriately the operation of paper feed motor 24, carriage motor 22, and print head 211. Printer paper P supplied to color printer 20 is arranged so as to be drawn between platen 23 and the auxiliary paper feed roller, and is advanced in predetermined increments depending on the angle of rotation of platen 23.

A ink cartridge 212 and an ink cartridge 213 are installed on carriage 21. Ink cartridge 212 contains black (K) ink, while ink cartridge 213 contains other inks, specifically, inks of the three colors, cyan (C), magenta (M), yellow (Y), plus light cyan (LC), light magenta (LM), and dark yellow (DY), for a total of six color inks.

Figure 7:
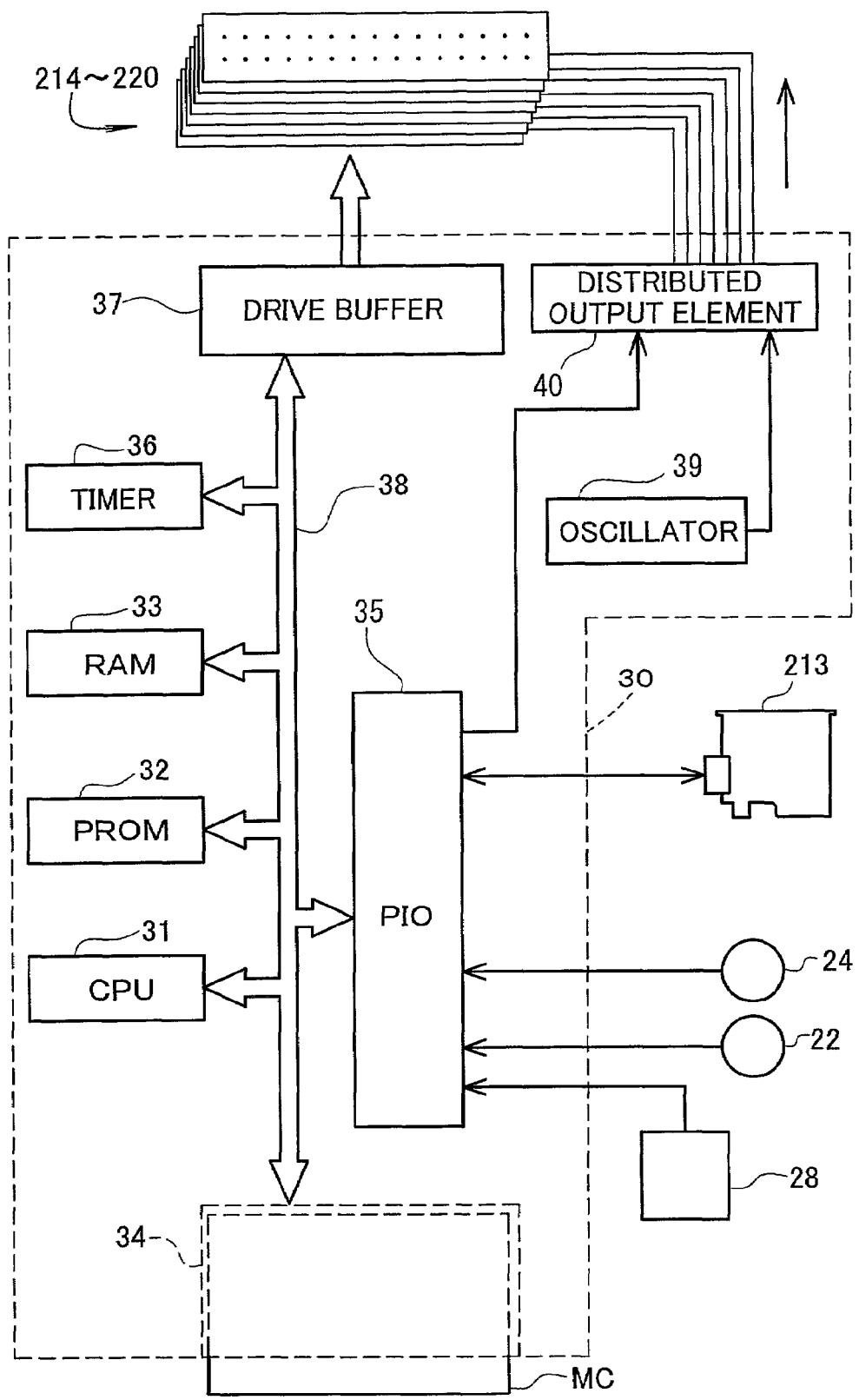
FIG. 7 is an illustrative diagram showing the internal arrangement of control circuit of color printer.

The internal arrangement of control circuit 30 of color printer 20 is now described with reference to FIG. 7. FIG. 7 is an illustrative diagram showing the internal arrangement of control circuit 30 of color printer 20. As shown in the drawing, control circuit 30 includes a CPU 31; PROM 32; RAM 33; a PCMCIA slot 34 for data interface with a memory card MC; a peripheral I/O portion (PIO) 35 for data interface with paper feed motor 24, carriage motor 22 etc.; a timer 36; a drive buffer 37; etc. Drive buffer 37 is used as a buffer for supplying dot ON/OFF signals to ink jet heads 214-220. These are interconnected by means of a bus 38 to enable data interchange between them. Control circuit 30 additionally includes an oscillator 39 for outputting a drive waveform of predetermined frequency, and a distributed output element 40 for distributing the output of oscillator 39 to ink jet heads 214-220 under a predetermined timing arrangement.

Control circuit 30 reads out an image file GF from memory card MC, analyzes the appended information Al, and performs graphics processing on the basis of the analyzed appended information Al. Control circuit 30 outputs dot data to drive buffer 37 under a predetermined timing arrangement synchronized with operation of the paper feed motor 24 and carriage motor 22. The specifics of the graphics processing performed by control circuit 30 are discussed later.

D. Graphics Processing in a Digital Still Camera

Figure 8:
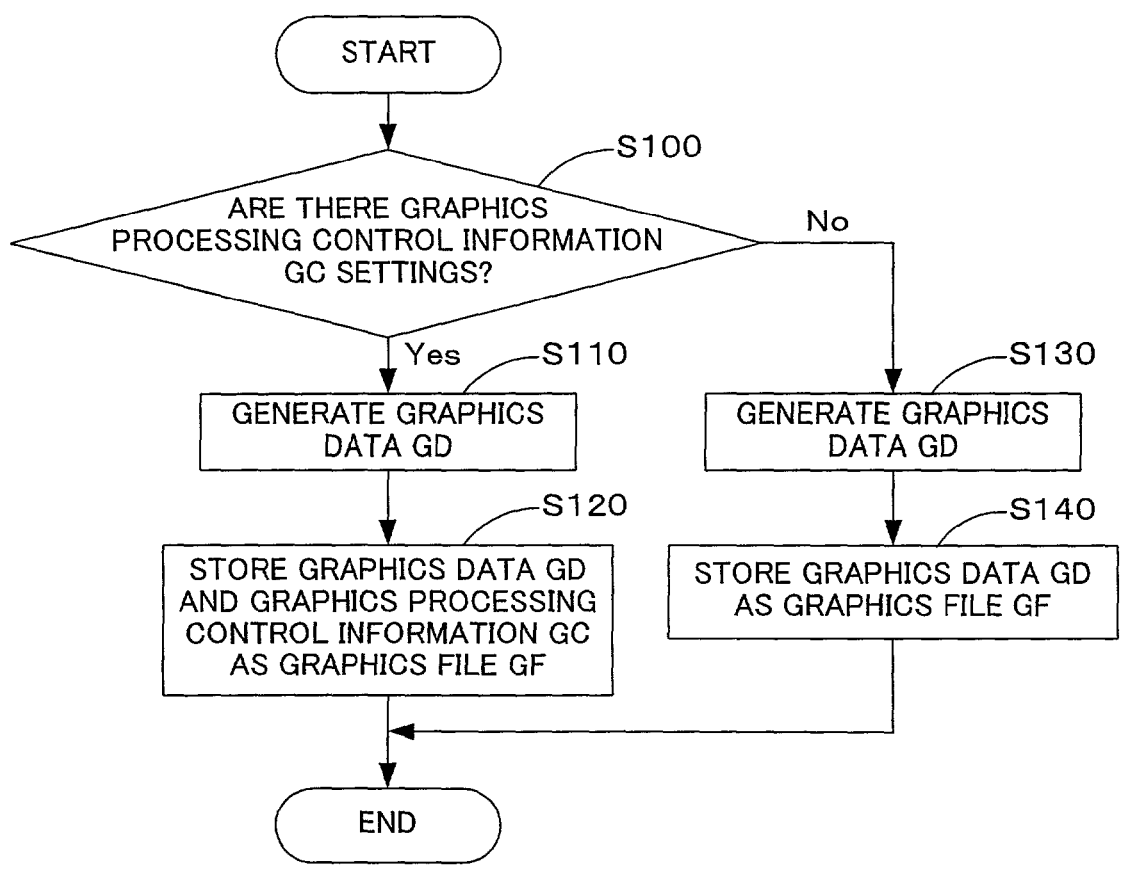
FIG. 8 is a flow chart depicting generation of a graphics file by digital still camera.

The following description of graphics processing in a digital still camera 12 makes reference to FIG. 8. FIG. 8 is a flow chart depicting generation of a graphics file GF by digital still camera 12.

The control circuit 124 of digital still camera 12 determines whether any picture mode or graphics processing control information (graphics processing control parameters)—such as white balance or exposure bias value—has been set by the user prior to shooting (STEP S100). Graphics processing control information settings are made by the user by operating the Select/Set button 126 to select from among preprogrammed picture modes displayed on liquid crystal display 127. Alternatively, the user may make settings by operating the Select/Set button 126 to set values of graphics processing control parameters, such as brightness or contrast, on liquid crystal display 127.

Figure 9:
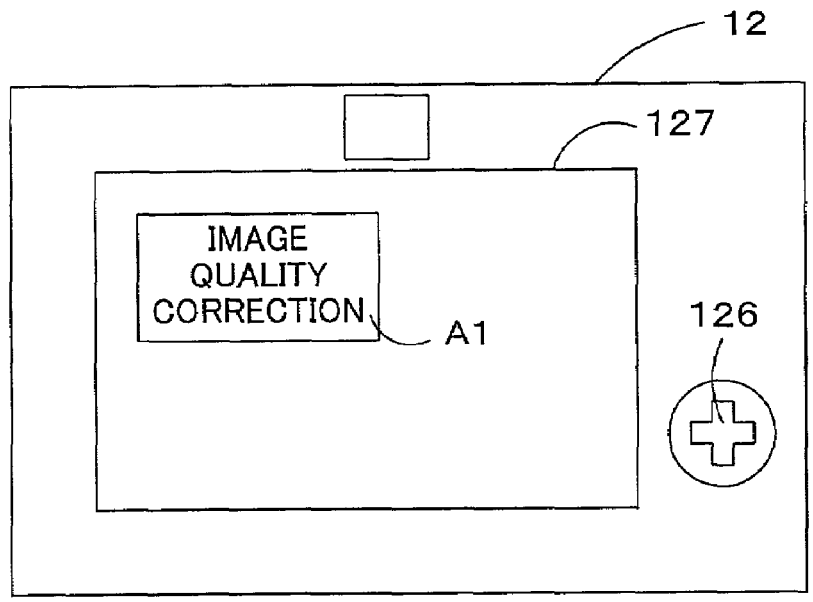
FIG. 9 is an illustrative diagram showing an exemplary display mode of liquid crystal display.
Figure 10:
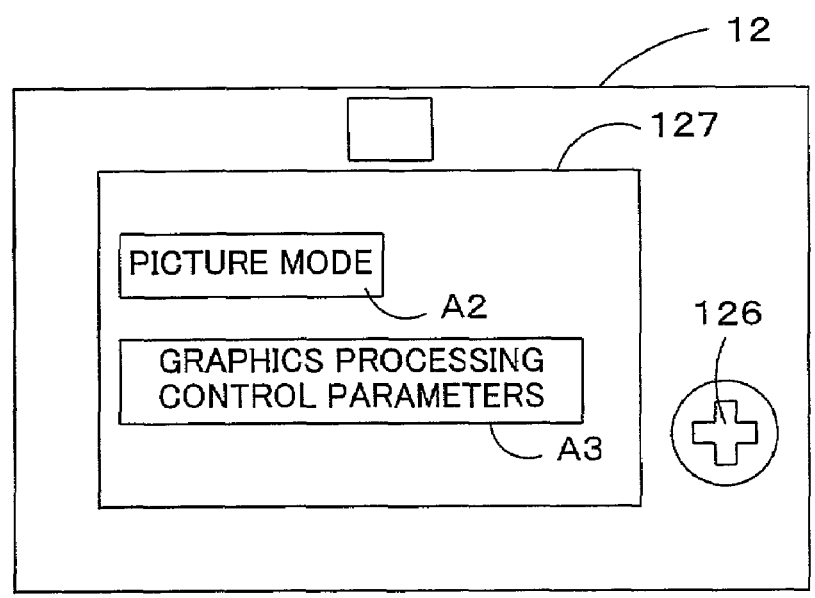
FIG. 10 is an illustrative diagram showing an exemplary display mode of liquid crystal display.
Figure 11:
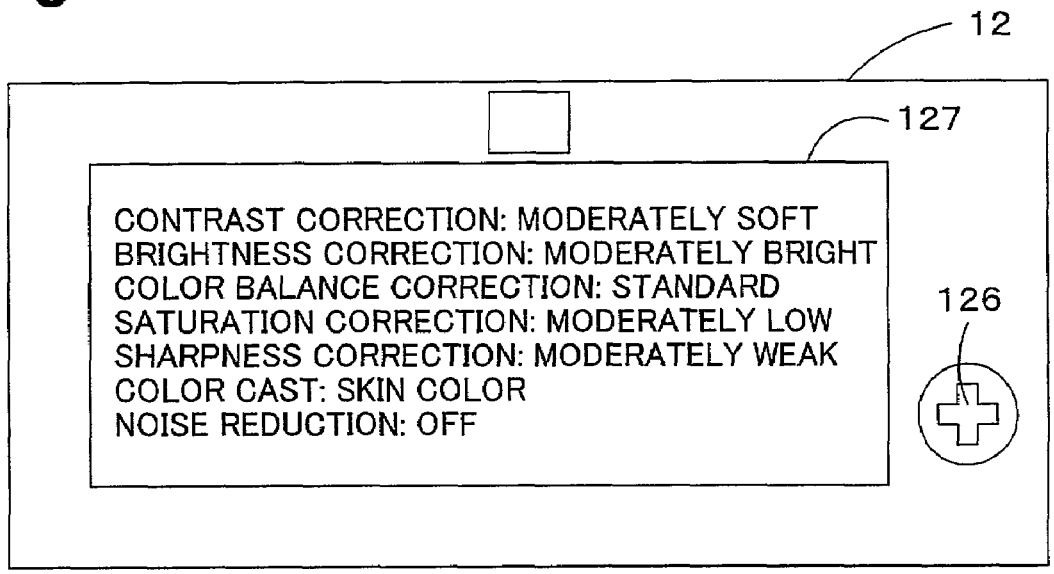
FIG. 11 is an illustrative diagram showing an exemplary display mode of liquid crystal display.

The following description of the process for setting graphics processing control parameters on liquid crystal display 127 using Select/Set button 126 makes reference to FIGS. 9 to 11. FIGS. 9 to 11 are illustrative diagrams showing exemplary display modes of liquid crystal display 127. When Select/Set button 126 is operated to select the "Graphics Processing Control" field A1 displayed on liquid crystal display 127 (see FIG. 9), a "Picture Mode" field A2 and a "Graphics Processing Control Parameters" field A3 are displayed on liquid crystal display 127 (see FIG. 10). Picture mode is set using numbers 1, 2 . . . , and graphics processing control parameters are set by entering the desired number. For example, with the device set to any picture mode, settings for individual graphics processing control parameters in the selected picture mode are shown on liquid crystal display 127, as shown in FIG. 11. In this example, graphics processing control parameter settings are displayed in a user-friendly way, but parameter values could be displayed instead.

If control circuit 124 determines that graphics processing control information has been set (STEP S100: Yes), it generates—in response to a shoot request, such as depression of the shutter button, for example—graphics data GD using parameter values defined by the set graphics processing control information (STEP S110). Control circuit 124 then stores a graphics file containing the generated graphics data GD and graphics processing control information GC—which includes arbitrarily set correction conditions and automatically appended correction conditions—on memory card MC (STEP S120). It then terminates the routine. Data generated by digital still camera 12 is converted from an RGB color space, to be represented in a YCbCr color space.

If, on the other hand, control circuit 124 determines that graphics processing control information has not been set (STEP S100: No), it generates graphics data GD in response to a shoot request (STEP S130). Control circuit 124 then stores a graphics file containing the generated graphics data GD and graphics processing control information GC—which includes correction conditions appended automatically during creation of the graphics data—on memory card MC (STEP S140), and then terminates the routine. As noted, this graphics processing control information GC is stored in Exif maker note area in a file structure having a specific file format.

By means of the above process performed in digital still camera 12, the graphics file GF stored on memory card MC is provided with graphics data GD and with graphics processing control information GC that includes correction conditions appended automatically during creation of the graphics data, and arbitrarily set correction conditions.

E. Image Processing in Color Printer 20

Figure 12:
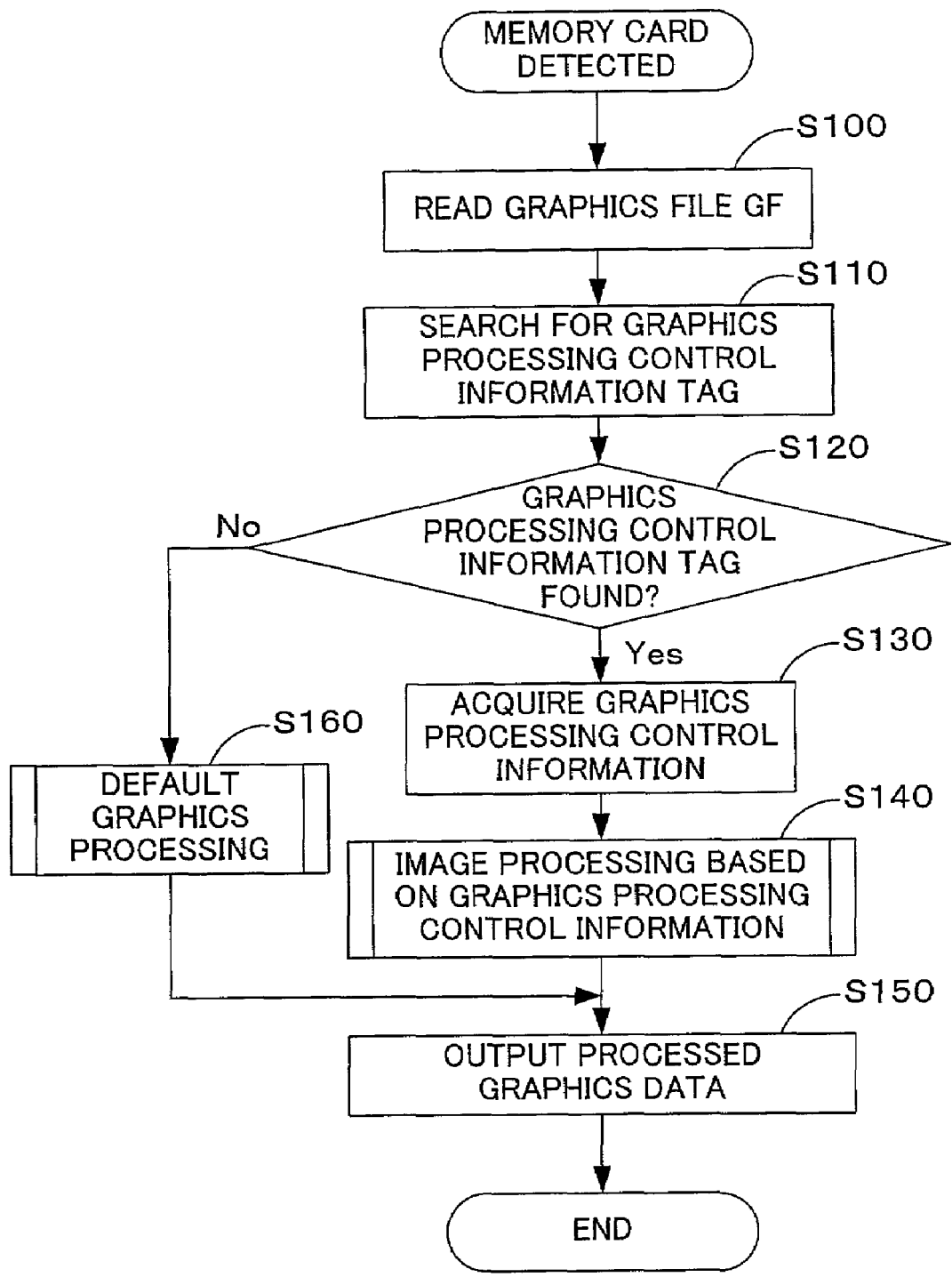
FIG. 12 is a flow chart showing the processing routine for image processing by the color printer in the first embodiment.
Figure 13:
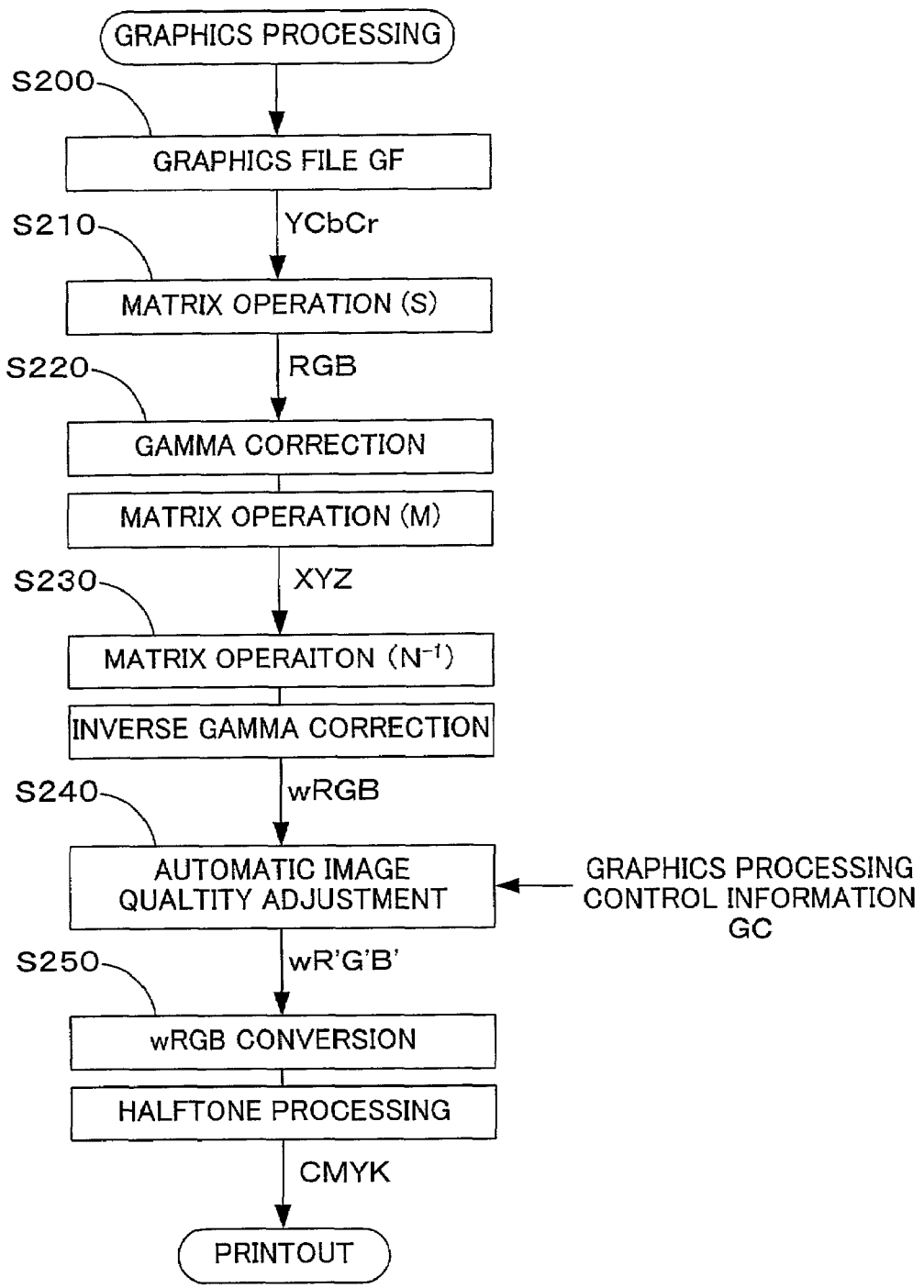
FIG. 13 is a flow chart depicting the flow of image processing in color printer in the first embodiment.
Figure 14:
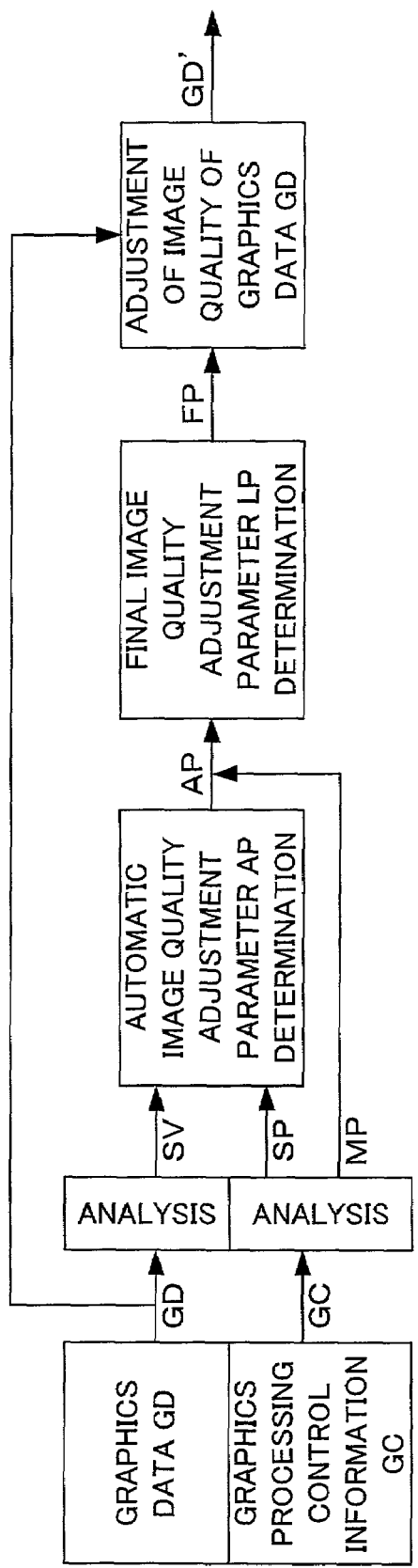
FIG. 14 is an illustrative diagram showing the concept of automatic image quality adjustment processing in color printer in the first embodiment.
Figure 15:
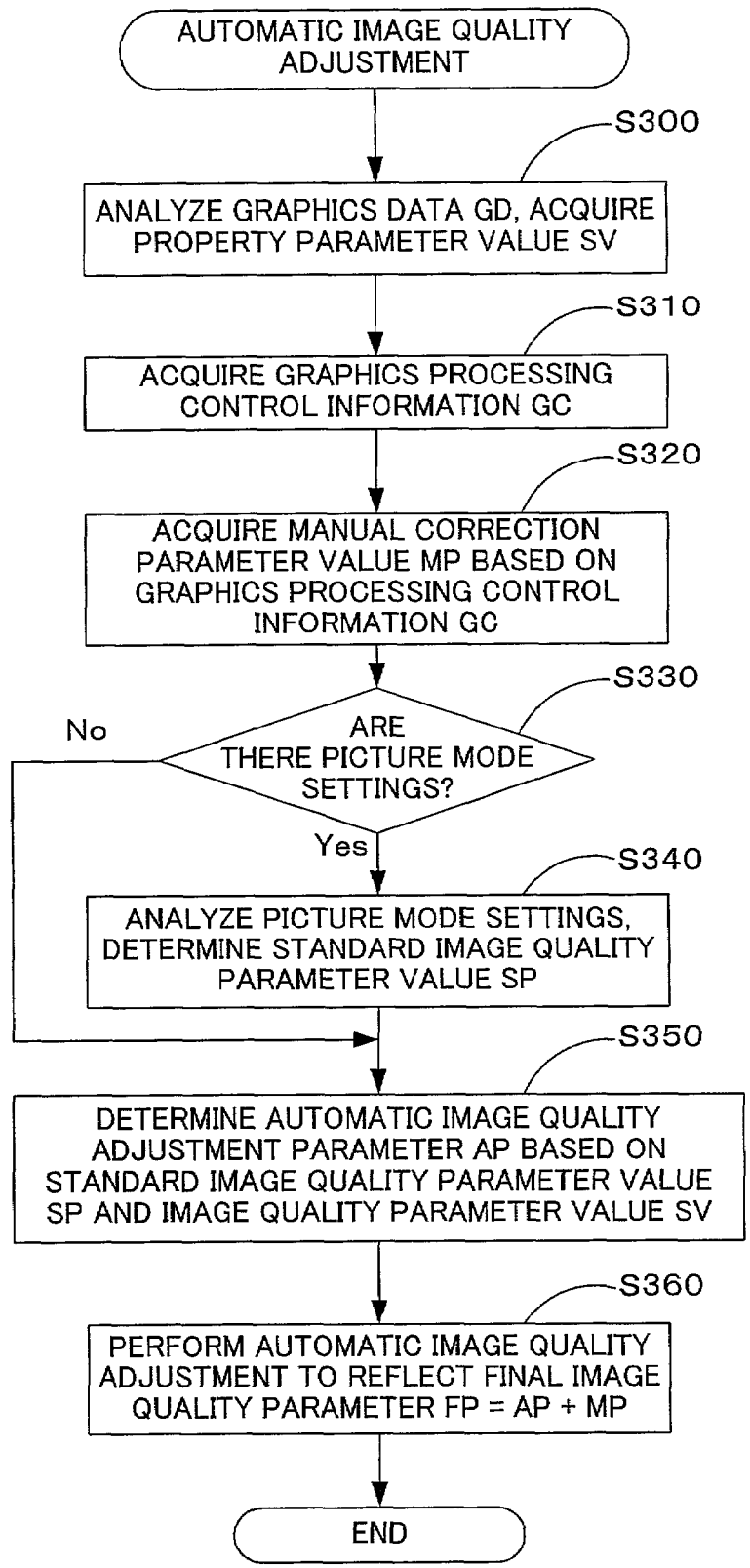
FIG. 15 is a flow chart showing the processing routine for automatic image quality adjustment in color printer.

Image processing in color printer 20 pertaining to the present embodiment is now described with reference to FIGS. 12-15. FIG. 12 is a flow chart showing the processing routine for image processing by the color printer 20 pertaining to the present embodiment. FIG. 13 is a flow chart depicting the flow of image processing in color printer 20. FIG. 14 is an illustrative diagram showing the concept of automatic image quality adjustment processing in color printer 20. FIG. 15 is a flow chart showing the processing routine for automatic image quality adjustment in color printer 20. Graphics processing in the color printer 20 pertaining to the present embodiment involves first performing color space conversion, and then performing automatic image quality adjustment.

When a memory card MC is inserted into slot 34, the control circuit 30 (CPU 31) of color printer 20 reads out a graphics file GF from memory card MC, and temporarily places the graphics file GF in RAM 33 (STEP S100). CPU 31 searches in the appended information storage area 102 of the graphics file GF for graphics processing control information GC indicating information created at generation of the graphics data (STEP S110). If CPU 31 finds graphics processing control information (STEP S120: Yes), it acquires and analyzes the graphics processing control information GC created at generation of the graphics data (STEP S130). On the basis of the analyzed graphics processing control information GC, CPU 31 performs graphics processing, described in detail later (STEP S140), and prints out the processed graphics data (STEP S150).

If CPU 31 does not find graphics processing control information (STEP S120: No), since graphics processing control information created at generation of the graphics data cannot be reflected, color printer 20 performs default graphics processing with preset defaults, i.e. parameter values, acquired from ROM 32 (STEP S160). CPU 31 prints out the processed graphics data (STEP S150) and terminates the routine.

The following description of image processing by color printer 20 makes reference to FIG. 13. The CPU 31 of color printer 20 extracts graphics data GD from the read out graphics file GD (STEP S200). As noted, digital still camera 12 stores graphics data as JPEG format files; to increase the compression ratio, graphics data in JPEG files is stored using a YCbCr color space.

CPU 31 performs a 3×3 matrix operation S to convert YCbCr graphics data to RGB graphics data (STEP S210). Matrix operation S is given by the equation illustrated in FIG. 21.

CPU 31 performs gamma correction and a matrix operation M on the RGB color space graphics data obtained in the preceding manner (STEP S220). During gamma correction, CPU 31 acquires the DSC gamma value from the graphics processing control information GC and uses the acquired gamma value for gamma conversion of the graphics data. Specifically, a gamma value is included among the graphics processing control parameters designated by graphics processing control information GC. Matrix operation M is an operation for converting an RGB color space to an XYZ color space. Since the graphics file GF used in the present embodiment can designate color space information to be used during graphics processing, if the graphics file GF does include color space information, CPU 31 will refer to this color space information when performing matrix operation M, and will perform the matrix operation using a matrix (M) corresponding to the designated color space. Matrix operation M is given by the equation illustrated in FIG. 22.

The color space of the graphics data GD derived from matrix operation M is the XYZ color space. In conventional practice, sRGB is the default color space used for image processing in printers and computers, so the native color space of digital still camera 12 cannot be utilized to full advantage. In the present embodiment, on the other hand, where a color space is designated by a graphics file GF, the printer (printer driver) modifies the matrix (M) used for matrix operation M in accordance with this color space information. Accordingly, the native color space of digital still camera 12 can be utilized effectively, so as to achieve accurate color reproduction.

In order to perform image adjustment based on graphics processing control information GC, CPU 31 converts the color space of graphics data GD from the XYZ to the wRGB color space, i.e., it performs a matrix operation $N^{-1}$ and inverse gamma correction (STEP S230). The wRGB color space is wider than the sRGB color space. For inverse gamma correction, CPU 31 acquires from ROM 32 the default gamma value for the printer, and performs inverse gamma conversion on the graphics data using the inverse of the acquired gamma value. When performing matrix operation $N^{-1}$ CPU 31 uses a matrix ($N^{-1}$) —corresponding to conversion to the wRGB color space—from ROM 31 to perform the matrix operation. Matrix operation $N^{-1}$ is given by the equation illustrated in FIG. 23.

The color space of the graphics data GD derived from matrix operation $N^{-1}$ is the wRGB color space. As noted, this wRGB color space is wider than the sRGB color space, and corresponds to the RGB color space representable by digital still camera 12.

CPU 31 performs automatic adjustment of image quality (STEP S240). The following description of the concept of automatic image quality adjustment processing in the present embodiment makes reference to FIG. 14. Graphics file GF contains graphics data GD whose image quality is to be adjusted, and graphics processing control information GC used for this image quality adjustment. Color printer 20 (CPU 31) analyzes the graphics data GD to acquire graphics statistical values (property parameter values) SV indicating properties of the graphics data GD, and also analyzes the graphics processing control information GC to acquire standard image quality parameters SP and manual correction parameters MP. On the basis of the graphics statistical values SV and standard image quality parameters SP, color printer 20 determines automatic image quality adjustment parameters AP, and also determines final image quality adjustment parameters FP (=AP+MP). Color printer 20 adjusts the image quality of the graphics data GD using these final image quality adjustment parameters, and outputs the adjusted graphics data GD' to the printer driver.

The following detailed description of the automatic image quality adjustment process makes reference to FIG. 15. First, the graphics data GD is analyzed to acquire a number of property parameter values (graphics statistical values) SV that indicate properties of the graphics data GD, which are then stored temporarily in RAM 32 (STEP 300). CPU 31 acquires graphics processing control information GC from the graphics file GF (STEP S310) and on the basis of this graphics processing control information GC acquires manual correction parameters MP (STEP S320). The manual correction parameters MP include graphics processing control parameters such as white balance, exposure bias value, exposure time, aperture, ISO, focal distance, etc. These manual correction parameters MP are independent of the result of analysis of the graphics data GD, i.e., of the graphics statistical values SV, and these values are reflected as-is in the final image quality adjustment parameters FP.

CPU 31 determines whether the graphics processing control information GC contains a parameter value that designates a picture mode (STEP S320). The present embodiment employs picture modes that are combinations of a plurality of graphics processing control parameters differing for each photographed scene, when determining the automatic image quality adjustment parameters AP, i.e. automatic image quality adjustment levels that reflect the graphics statistical values SV. In the present embodiment, since picture mode is designated by a reference number (1, 2 . . . ), if a picture mode is designated, the individual graphics processing control parameters that define each picture mode must be analyzed and determined on the basis of the reference number. If CPU 31 determines that a picture mode has been designated (STEP S330: Yes), it analyzes the picture mode on the basis of the designated reference number, acquires the graphics processing control parameters that define the picture mode, and determines standard image quality parameter values SP by means of a process described later (STEP S340). As noted, manual correction parameters MP may be designated in parallel, even if picture mode is set.

Combinations of graphics processing control parameters that define picture modes, and a combination of numerical values that designate picture modes, are given in FIG. 16. FIG. 16 is an illustrative diagram showing exemplary combinations of picture mode, image quality parameters, and numerical values designating picture mode. The items "contrast" and "brightness" for each picture mode are described in such a way as to facilitate understanding of the image quality resulting from automatic adjustment of image quality; the status of image quality designated by each item is analyzed by CPU 31, and the designated image quality status is produced by setting a single, or a plurality of, graphics processing control parameter values for each item. Picture Mode 1 is appropriate for standard a photographic condition, for example; Picture Mode 2 is appropriate for a photographic condition for portrait photography, for example; Picture Mode 3 is appropriate for a photographic condition for landscape photography, for example; Picture Mode 4 is appropriate for a photographic condition for evening photography, for example; Picture Mode 5 is appropriate for a photographic condition for night photography, for example; Picture Mode 6 is appropriate for a photographic condition for photographing flowers, for example; Picture Mode 7 is appropriate for a photographic condition for macro photography, for example; Picture Mode 8 is appropriate for a photographic condition for sports photography, for example; Picture Mode 9 is appropriate for a backlit photographic condition for example; Picture Mode 10 is appropriate for a photographic condition for photographing fall foliage, for example; and Picture Mode 11 is appropriate for a photographic condition for photographing souvenir snapshots, for example. If no picture mode is set, the parameter indicating the picture mode setting is set to "0".

If CPU 31 determines that no picture mode has been designated, i.e. that the picture mode parameter is set to "0" (STEP S330: NO), it proceeds to the process of STEP S350 in order to reflect individually set graphics processing control parameters in the image quality adjustment process.

CPU 31 modifies (corrects) the standard values set for each parameter, while reflecting the acquired graphics processing control parameter values. Standard value settings for parameters are values that assume that graphics data has been generated under typical image generating conditions. In order that automatic image quality adjustment may correctly reflect the intention of the photographer (image creator), standard values are modified given especial consideration to individual graphics processing control conditions for those graphics processing control conditions that can be set by the photographer. These standard values are parameter index values for optimizing predetermined image output results by means of image evaluation by quantitative evaluation and responsive evaluation.

For example, where the picture mode parameter is set to "2", the standard value for brightness is modified from its base value of 128 to a somewhat brighter value of 144, the standard value for saturation is modified from its base value of 128 to the somewhat lower value of 102, and the standard value for sharpness is modified from its base value of 200 to the somewhat lower value of 150. The contrast correction coefficient is charged from it base value of 5 to a somewhat softer value of 2, while the color balance correction coefficient is left unchanged. Standard values and coefficients are modified, for example, by increasing or decreasing the numerical values for the standard values and coefficients, or by increasing or decreasing standard values and coefficients by predetermined percentages. Alternatively, as regards the standard value for brightness, for example, default values of 144 for "moderately bright" and 122 for "moderately dark" may be established, and the standard value replaced depending on the trend of correction—whether this be either moderately bright or moderately dark.

CPU 31 calculates a differential between an image quality parameter value SV and a standard image quality parameter SP corrected in the above-described manner, and designates this differential as an automatic image quality adjustment parameter AP (STEP S350). Where image quality parameter values SV are, for example, brightness of 160 and sharpness of 155, the automatic image quality adjustment parameter AP for brightness=16=160–144, and the automatic image quality adjustment parameter AP for sharpness=5=155–150.

Figures 17, 18:
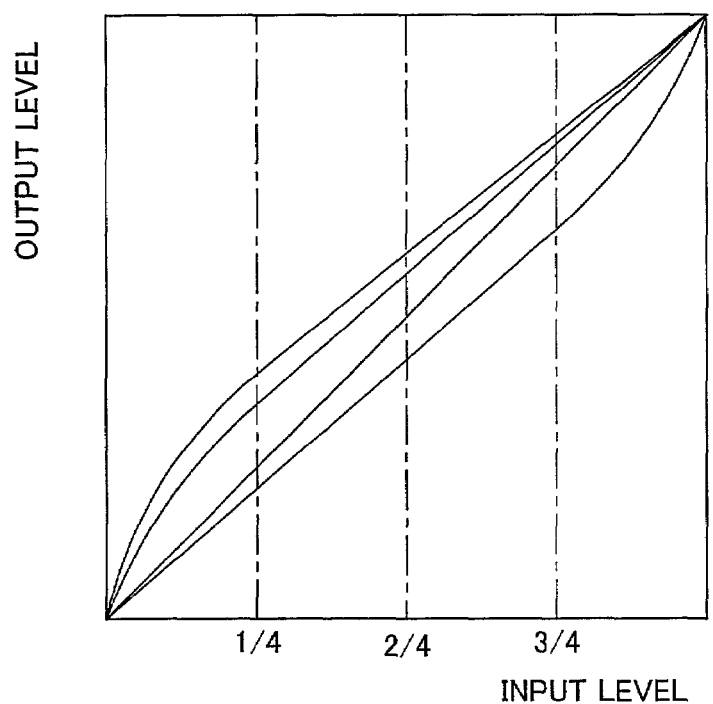
FIG. 17 is an illustrative diagram giving exemplary AP, MP, FP and FP' values for the brightness and sharpness parameters.
FIG. 18 is an illustrative diagram showing exemplary tone curves modified to reflect final image quality adjustment parameters FP.

As shown in FIG. 17, CPU 31 then calculates a final image quality adjustment parameter FP (graphics data correction level)=AP+MP from the designated automatic image quality adjustment parameter AP and the manual correction parameter MP, and performs automatic image quality adjustment so as to reflect this final image quality adjustment parameter FP (STEP S360). FIG. 17 is an illustrative diagram giving exemplary AP, MP, FP and FP' values for the brightness and sharpness parameters. Where manual correction parameters MP include, for example settings of +10 for brightness and −10 for sharpness, the final image quality adjustment parameter FP for brightness=16+10=26, and the final image quality adjustment parameter FP for sharpness=5−10=−5. For the image quality parameters of shadow, highlight, brightness, contrast, color balance and memory color, CPU 31 performs image adjustment using a tone curve (S curve)—shown in FIG. 18—that associates input level and output level for the RGB components of the graphics data GD. FIG. 18 is an illustrative diagram showing exemplary tone curves modified to reflect final image quality adjustment parameters FP. When adjusting image quality using tone curves, a single tone curve for each of the RGB components is modified so as to reflect FPs for each image quality parameter, and finally the modified tone curves for the RGB components are used to perform input-output conversion for the RGB components of the graphics data GD. The result in graphics GD has adjusted image quality.

Automatic image quality adjustment processing for image quality parameters is performed in the following specific manner, for example.

For contrast, shadow, and highlight: shadow points and highlight points in the graphics data are detected, subjected to level correction on the basis of standard values, and then undergo histogram stretching. Based on standard deviation of luminance, the tone curve is corrected based on a standard value.

For brightness: graphics data is divided into 14 individual zones, and on the basis of luminance values calculated therefrom, the image is determined to be either "dark" (underexposed) or "bright" (overexposed), and the tone curve is corrected based on a standard value.

For color balance: color balance deviation is analyzed from histograms for the R component, G component, and B component of the graphics data, and the tone curves for the R component, G component, and B component are corrected on the basis of standard values to reduce color cast. When set to picture mode 4 or 5, color cast is in fact deliberately created, so color balance is not adjusted automatically, with image quality correction being performed so as the reflect the intention of the user.

For saturation: the saturation distribution of the graphics data is analyzed, and saturation is enhanced on the basis of a standard value. Thus, the level of saturation enhancement is greater the lower the saturation of the graphics data.

For sharpness: the frequency and edge intensity distribution of the graphics data are analyzed, and correction performed using an unsharp mask on the basis of standard values. Standard values are determined on the basis of frequency distribution, with standard values being smaller for high-frequency graphics data (such as landscapes) and larger for low-frequency graphics data (such as portraits). The level of application of the unsharp mask will depend on the edge intensity distribution; the level is greater the more blurry the graphics data.

For memory color: generally, for "skin color", "green color" "sky color" and "sunset red color", referred to as memory colors, the color layer of interest is extracted from the graphics data to correct it to the desired tone.

For noise reduction: for the color difference components Cb and Cr of YCbCr, color noise is reduced using a smoothing filter.

The graphics processing control parameters also include a level designating parameter LP designating an application level for the final image adjustment parameter FP, i.e., the extent to which graphics data DG will be brought into approximation with graphics data based on standard values. Level designating parameter LP is employed, for example, in the following manner: FP'=AP*(LP/5)+MP, and as such is reflected in automatic correction parameter AP only, and not in manual correction parameter MP. Thus, as shown in FIG. 17, where LP=10, for example, the final image adjustment parameter AP value will be multiplied by a factor of 2, and where LP=5, the final image adjustment parameter AP value will be multiplied by a factor of 1. The tone curve is modified on the basis of FP'; where LP=10, the extent of modification of the tone curve is multiplied by a factor of 2. Modification may also involve simply bringing to a level approximating the standard value, without modifying the standard value.

The discussion now turns to automatic image quality adjustment processing reflecting graphics processing control parameters for operating (shooting) conditions of digital still camera 12—specifically, light metering technique and lens focal distance. Where the graphics processing control parameter for light metering technique indicates spot metering, multi-spot metering, or partial metering, automatic image quality adjustment processing is not performed for brightness (lightness). The usual metering technique is to compute overall brightness to arrive at the proper exposure; with spot metering, however, brightness is metered in a portion of the scene, and the proper exposure for the metered area is determined. In other words, the user indicates a desired proper exposure for a specific area of the scene. In such instances, automatically adjusting brightness will result in image quality adjustment that does not reflect the intention of the user. Accordingly, brightness is not adjusted automatically in these three metering modes.

The standard value for sharpness is modified on the basis of lens focal distance and F number when the picture is taken. Typically, "blur" is determined by the lens focal distance and F number (aperture). Accordingly, when automatically adjusting sharpness, the standard value for sharpness is associated with lens focal distance and F number so as to enable image quality adjustment processing to reflect hypothetical blur when shooting. For example, for a wide-angle lens (i.e. 35 mm or smaller) at F13 (stopped down), it may generally be assumed that the intention of the photographer is for the entire scene—ranging from the foreground to the background—of a landscape or souvenir shot to be in sharp focus. In such an instance image quality processing is performed by decreasing the standard value for sharpness so that most image features are sharp, and increasing the level of sharpness application to provide sharpness. For a telephoto lens (100 mm or larger) at F2 (wide open), on the other hand, it may generally be assumed that the intention of the photographer is for the background to be blurred so that the subject of a portrait, etc. stands out. In such an instance image quality processing is performed by increasing the standard value for sharpness to provide sharpness exclusively at the transition from subject to background—without sharpening smooth areas such as the skin—and decreasing the level of sharpness application to provide roughness to skin, etc.

Figure 19:
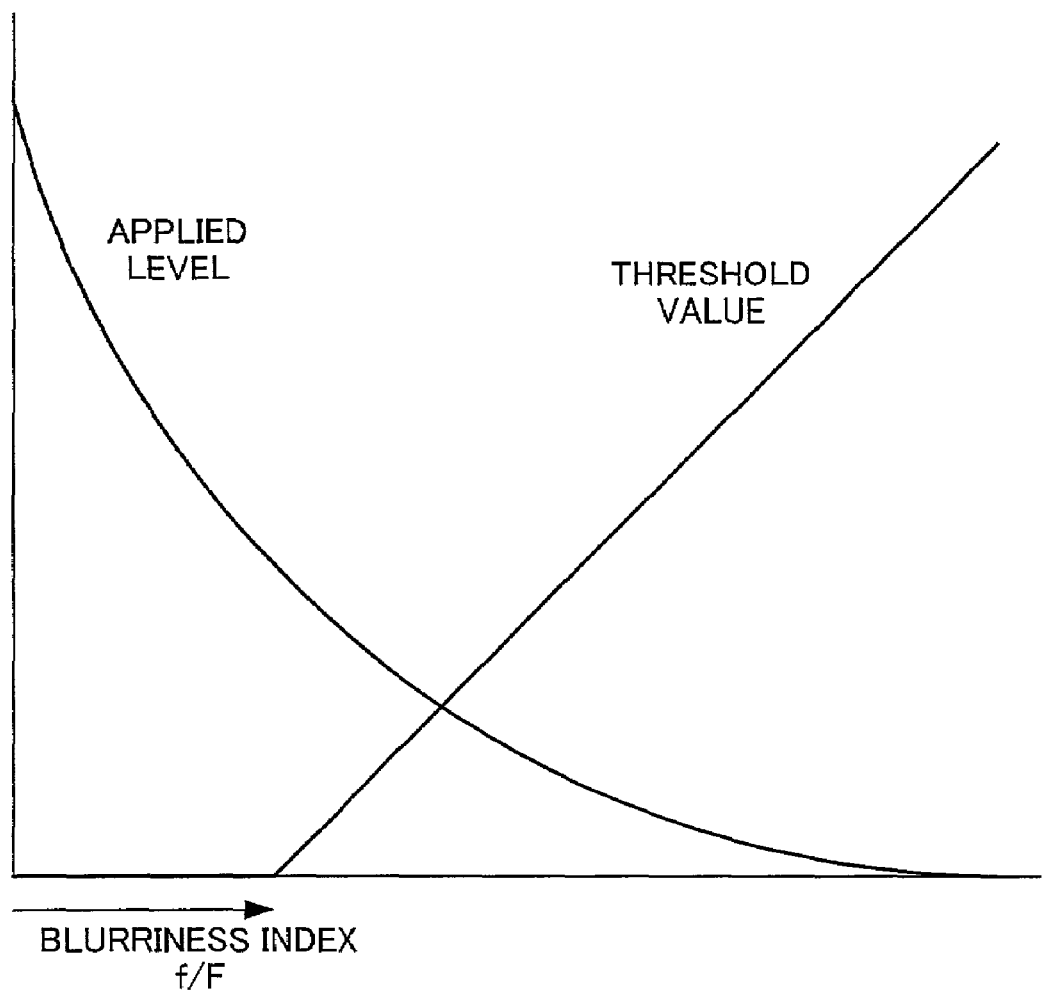
FIG. 19 is an illustrative diagram describing a blurriness index f/F calculated from lens focal distance f (mm) and F number.

Defining a blurriness index f/F, calculated from the lens focal distance f (mm) and the F number, gives the function shown in FIG. 19. FIG. 19 is an illustrative diagram describing a blurriness index f/F calculated from lens focal distance f (mm) and the F number.

After performing automatic image quality adjustment as described above (STEP S360), CPU 31 returns to the main routine, i.e., the graphics processing routine.

After completing automatic image quality adjustment processing, CPU 31 performs wRGB conversion and half-tone processing for printing (STEP S250). In the wRGB conversion process, CPU 31 refers to a lookup table (LUT) for CMYK color space conversion, associated with the wRGB color space and stored in ROM 31, and converts the graphics data from the wRGB color space to a CMYK color space. Specifically, graphics data consisting of R•G•B grayscale values is converted, for example, to grayscale data for each of six colors C•M•Y•K•LC•LM, used by the color printer 20.

In halftone processing, the color-converted graphics data is subjected to grayscaling. In the present embodiment, color-converted graphics data is represented as data having 256 shades for each color. In contrast, the color printer 20 in the embodiment can only assume one of two states: "print a dot" or "do not print a dot". That is, the color printer 20 herein can only produce two shades in a given location. Thus, 256-shade image data is converted into image data that the color printer 20 can represent using two shades.

Representative methods for two-shade conversion (binarization) are the error diffusion technique and the systematic dithering technique.

In color printer 20, if, prior to color conversion, the resolution of graphics data is lower than the print resolution, new data lying between adjacent image data is generated by means of linear interpolation; if, conversely, it is higher than the print resolution, a resolution conversion process wherein data is divided by a certain ratio to convert the graphics data resolution to the print resolution is performed. Color printer 20 subjects graphics data converted to dot print/not print format to an interlacing process wherein the data is rearranged in the sequence in which it will be sent to the color printer 20.

According to the digital still camera 12 in the embodiment set forth hereinabove, graphics processing control conditions for image quality adjustment processing by the printer 20 can be set from the digital still camera 12. It is therefore possible to make any desired graphics processing control condition settings when taking a picture, and to have image quality adjustment performed in such a way as to properly reflect the graphics processing control conditions desired when the picture is taken. Further, graphics processing control conditions assumed when taking a picture can be easily associated with the graphics data, and individual graphics processing control conditions can be imparted to individual sets of graphics data. Further, there is no need to reset graphics processing control conditions during automatic adjustment of image quality of graphics data, facilitating image quality adjustment that reflects graphics processing control conditions.

According to the color printer 20 in the embodiment set forth hereinabove, image quality of graphics data GD can be adjusted automatically so as to reflect graphics processing control information GC included in the graphics file GF. Thus, image quality can be adjusted automatically in an appropriate manner for individual sets of graphics data, so as to reflect photographic conditions when a picture is taken. Where the user has intentionally set graphics processing control conditions for graphics data, image quality is adjusted automatically so as to reflect the intentionally set graphics processing control conditions, thus solving a problem pertaining to conventional automatic image quality adjustment, namely, that intentionally set graphics processing control conditions are corrected so that image does not reflect the intent of the user.

Since image quality is corrected automatically using graphics processing control information GC included in the graphics file GF, printed results of high quality that reflect the photographic intention of the user can be achieved easily, without the need to perform image quality adjustment with a photo retouching application or printer driver.

In the preceding embodiment, image quality adjustment is performed automatically; however, it would be possible to provide an automatic image quality adjustment button on the control panel of the color printer 20, so as to allow automatic image quality adjustment herein to be performed only when automatic image quality adjustment has been selected by means of the automatic image quality adjustment button.

F. Other Embodiments

In the preceding embodiment, graphics processing control information GC is reflected by a process of analyzing the graphics processing control information GC, acquiring graphics processing control parameters, and modifying standard values and application levels; however, graphics data GD could be corrected directly on the basis of graphics processing control information GC. This could be accomplished by having graphics processing control information GC include information indicating the extent to which the graphics data GD should be modified, for example, increasing the brightness correction level by +10 to increase brightness by +10%. With this arrangement, image quality adjustment may be made to reflect the trend of correction intended by the user, unaffected by the image quality properties of the graphics data GD.

In the preceding embodiment, all image processing is performed in the color printer 20 without the aid of a personal computer PC, and a dot pattern is produced on a print medium according to the graphics data GD generated thereby. However, all or a portion of the image processing could be performed on a computer, or on a server over a network. This could be achieved by means of a graphics data processing application (program)—namely, a retouching application or printer driver—installed on the hard disk etc. of a computer, and having an image processing function described with reference to FIG. 14. A graphics file GF generated by digital still camera 12 is supplied to the computer via a cable or memory card MC. The application is run on the computer under user control, whereupon the application reads the graphics file GF, analyzes the graphics processing control information GC, and converts and adjusts the graphics data GD. Alternatively, the application can be designed to run automatically when detecting insertion of a memory card MC or detecting attachment of a cable, whereupon the application reads the graphics file GF, analyzes the graphics processing control information GC, and converts and adjusts the graphics data GD automatically.

Property parameter values for automatic image quality adjustment may be made selectable. This could be accomplished, for example, by providing color printer 20 with parameter selection buttons, or with picture mode parameter selection buttons for setting predetermined parameter combinations for different subjects, so as to allow parameters for automatic image quality adjustment to be selected by means of the selection buttons. Where automatic image quality adjustment is performed on a computer, parameters for automatic image quality adjustment could be selected from the user interface of the printer driver or retouching application.

Figure 20:
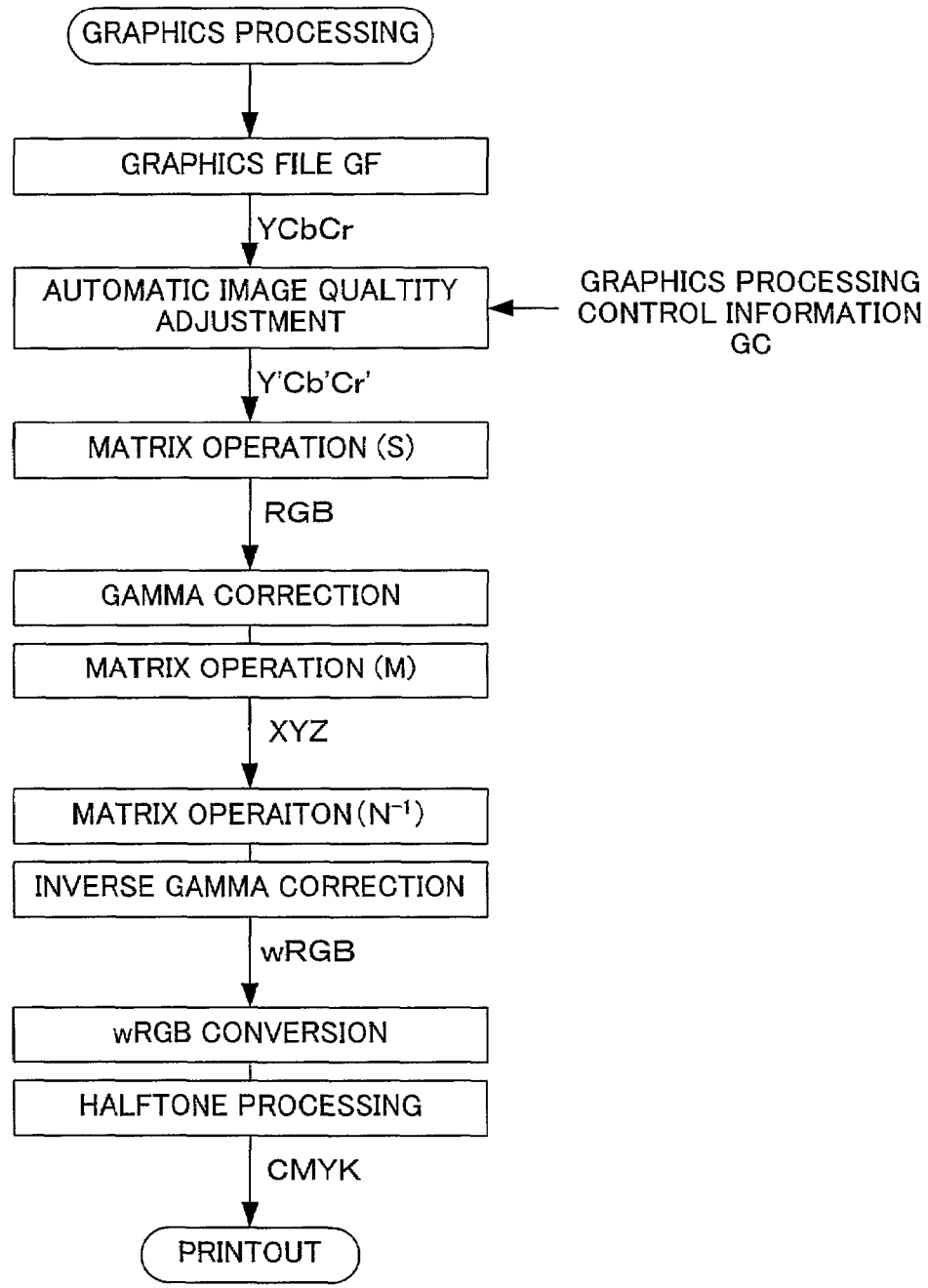
FIG. 20 is a flow chart showing the graphics processing routine in another embodiment of the present invention.

Graphics processing by color printer 20 may be performed prior to automatic image quality adjustment, as shown in FIG. 20 with color space conversion performed afterward. Basic information may be processed.

While the preceding embodiments all employs a color printer 20 as the output device, a display device such as a CRT, LCD, projector etc. could also be used as the output device. In this case, depending on the display device used as the output device, an graphics processing program (display driver) for executing the image processing described in FIGS. 12, 13 etc., for example, could be used. Where the CRT etc. functions as a display device for a computer, the graphics processing program can be run on the computer. In this case the final output graphics data will have an RGB color space, not a CMYK color space.

Thus, in a manner analogous to reflecting information at the time of graphics data creation in the print output of color printer 20, it is possible to reflect graphics processing control information GC at the time of graphics data creation in the display on a CRT or other display device. Thus, graphics data GD generated by a digital still camera 12 can be more correctly displayed.

Although the output device, graphics processing device, and program of the invention has been shown and described with respect to certain preferred embodiments, these embodiments merely serve to facilitate understanding of the invention and should not be construed as limiting. It is obvious that equivalent alterations and modifications will occur to others skilled in the art without departing from the scope and spirit of the invention In the preceding embodiment, picture mode and graphics processing control parameters are set from the digital still camera 12, and the picture mode and graphics processing control parameters settings are then analyzed by printer 20, after which standard values are modified. In other words, automatic image quality adjustment of graphics data GD is performed with graphics processing control commands. However, the process for modifying standard values from picture mode and graphics processing control parameters could be performed in digital still camera 12, and standard values and application levels, i.e., values per se, provided to printer 20. With this arrangement, image quality adjustment for individual photographic conditions and image quality adjustment reflecting user intention can be performed automatically by providing a printer 20 an image quality adjustment function that uses standard values.

In the preceding embodiment, graphics processing control information GC includes the parameters of light source, exposure bias value, target color space, brightness and sharpness, but it is an arbitrary decision which parameters will be used as graphics processing control information GC.

The parameter values given in the chart in FIG. 8 are merely exemplary and imply no limitation of the invention. Likewise, the matrix S, M and $N^{-1}$ values in the Equations are merely exemplary, and may be modified as appropriate with reference to target color space, the color space that can be handled by color printer 20, and other such considerations.

While the embodiment set forth herein describes a digital still camera 12 as the image file generating device, scanners, digital video cameras or the like may be used as well. Where a scanner is used, specification of data for inclusion in an image file GF may performed on a computer PC, or performed with the scanner independently by providing the scanner with preset buttons having assigned thereto preset information for setting information, or with a display screen and setting buttons for making optional settings.

Whereas in the preceding embodiment, matrix M and matrix $N^{-1}$ operations are performed independently when converting color space properties from the sRGB color space to the wRGB color space, it would be possible to employ a composite matrix ($MN^{-1}$) composed from matrix M and matrix $N^{-1}$ for the matrix operation. Any of various conversion matrices may be composed if necessary. Composite matrices enable series of matrix operations to be performed more rapidly.

While the preceding embodiment describes an Exif format file as a specific exemplary graphics file GF, the graphics file format herein is not limited thereto. It is possible to use any graphics file that includes graphics data generated by a graphics data generating device, and graphics processing control information GC describing conditions at generation (information) of the graphics data. The use of such files enables graphics data generated by a graphics data generating device to have its image quality adjusted automatically for output by an output device.

The digital still camera 12 and color printer 20 used in the preceding embodiment are merely exemplary, and the arrangement thereof is not limited to that described in the embodiment. As regards the digital still camera 12, it is sufficient for the device to have, at a minimum, the function of generating the graphics file GF herein. As regards color printer 20, it is sufficient for the device to be capable, at a minimum, of analyzing graphics processing control information GC in the graphics file GF herein, automatically adjusting image quality (especially brightness) to reflect user intention, and outputting (printing) the image.

Graphics files GF that contain graphics data and graphics processing control information GC include files created by generating association data associated with graphics processing control information GC, and storing one, or a plurality of, sets of graphics data and graphics processing control information GC in separate files, so as to enable the image data and graphics processing control information GC to be associated by referring to the association data during image processing. While in this case graphics data and graphics processing control information GC are stored in separate files, during image processing using the graphics processing control information GC, the graphics data and graphics processing control information GC are indivisibly united, so functionality is substantially the same as with storage in a single file. That is, the use of associated graphics data and graphics processing control information GC —at least during image processing—is included in the definition of "graphics file GF" herein. Motion video files stored on optical media such as CD-ROM, CD-R, DVD-ROM and DVD-RAM are also included.

Obviously, numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

What is claimed is:

1. An image processing device for performing image processing on image data with image processing control information defining image quality correction condition in the image processing device, the image processing control information being related to the image data at an image data generating device, said image processing device comprising:
   an image data and image processing control information acquisition mechanism configured to acquire the image data and the image processing control information from the image data generating device;
   an image quality properties acquisition mechanism configured to analyze said image data and acquire image quality property information that indicates a property pertaining to an image quality of said image data; and
   an image quality adjustment mechanism configured to adjust the image quality of said image data with both the image processing control information and said acquired image quality property information.

2. An image processing device according to claim 1, wherein:
   said image quality property information is a combination of a plurality of image quality parameter values that indicate image quality properties of said image data; and
   said image quality adjustment mechanism is configured to perform image quality adjustment by adjusting the image quality of said image data so as to reflect said image processing control information.

3. An image processing device according to claim 1, wherein:
   said image quality property information is a combination of a plurality of image quality parameter values indicating image quality properties of said image data;

said image quality adjustment mechanism includes standard image quality parameter values serving as a basis for image quality adjustment, respective of said standard image quality parameter values being predetermined for each of said image quality parameter values; and said image quality adjustment mechanism performs image quality adjustment by calculating, on the basis of said standard image quality parameter values and said image quality parameter values, a level of correction for correcting said image data, increasing or decreasing said level of correction on the basis of an analysis result of said image processing control information, and adjusting said image data to reflect an increased or decreased level of correction.

4. An image processing device according to claim 3, wherein:
the image quality adjustment mechanism is configured to increase or decrease the level of correction made based on the analysis result and by correcting said standard image quality parameter values based on the analysis result.

5. An image processing device according to claim 3, wherein:
the image quality adjustment mechanism is configured to increase or decrease the level of correction made based on the analysis result and by determining an appropriate level of correction based on the analysis result.

6. An image processing device according to claim 1, further comprising:
an image data output mechanism configured to output image data subjected to image quality adjustment by said image quality adjustment mechanism.

7. An image processing device according to claim 1, wherein:
said image processing control information includes correction information for at least one item of information relating to contrast, brightness, color balance, saturation, sharpness, memory color, and noise reduction.

8. An image processing device according to claim 1, wherein:
said image processing control information is stored with the image data within one image file.

9. A method for performing image processing on image data with image processing control information defining image quality correction condition in the image processing device, the image processing control information being related to the image data at an image data generating device, said method comprising steps of:
acquiring the image data and the image processing control information from the image data generating device;
analyzing said image data;
acquiring image quality property information that indicates a property pertaining to an image quality of said image data; and
adjusting the image quality of said image data with both said image processing control information and said acquired image quality property information.

10. A method according to claim 9, wherein:
said image quality property information is a combination of a plurality of image quality parameter values that indicate image quality properties of said image data; and
said adjusting step includes adjusting the image quality of said image data so as to reflect said image processing control information.

11. A method according to claim 9, wherein:
said image quality property information is a combination of a plurality of image quality parameter values indicating image quality properties of said image data;
said adjusting step includes using standard image quality parameter values serving as a basis for image quality adjustment, respective of said standard image quality parameter values being predetermined for each of said image quality parameter values; and
said adjusting step includes calculating, on the basis of said standard image quality parameter values and said image quality parameter values, a level of correction for correcting said image data, increasing or decreasing said level of correction on the basis of an analysis result of said image processing control information, and adjusting said image data to reflect an increased or decreased level of correction.

12. A method according to claim 11, wherein:
said adjusting step includes increasing or decreasing the level of correction made based on the analysis result and correcting said standard image quality parameter values based on the analysis result.

13. A method according to claim 11, wherein:
said adjusting step includes increasing or decreasing the level of correction made based on the analysis result and by determining an appropriate level of correction based on the analysis result.

14. A method according to claim 11, wherein:
said image processing control information includes correction information for at least one item of information relating to contrast, brightness, color balance, saturation, sharpness, memory color, and noise reduction.

15. A method according to claim 11, wherein: said image processing control information is stored with the image data within one image file.

16. An image processing device for performing image processing on image data with standard image quality information serving as a basis for image quality correction of image data, the standard image quality information being related to the image data, said image processing device comprising:
an image quality parameter value acquisition mechanism configured to analyze said image data and acquire an image quality parameter value that indicates an image quality property of said image data;
a standard image quality parameter value acquisition mechanism configured to acquire a standard image quality parameter value predetermined for said image quality parameter, based on said standard image quality information; and
an image quality adjustment mechanism configured to adjust the image quality of said image data based on said standard image quality parameter value and said image quality parameter value acquired by said image quality parameter value acquisition mechanism.

17. An image processing device according to claim 16, further comprising:
an image data output mechanism configured to output image data subjected to image quality adjustment by said image quality adjustment mechanism.

18. An image processing device according to claim 16, wherein:
said image quality parameter value includes correction information for at least one item of information relating to contrast, brightness, color balance, saturation, sharpness, memory color, and noise reduction.

19. An image processing device according to claim 16, wherein:

said image quality parameter value is stored with the image data within one image file.

20. An image processing device for performing image processing on image data with image processing control information defining image quality correction in the image processing device, the image processing control information being related to the image data at an image data generating device, said image processing device comprising:

an image data and image processing control information acquisition mechanism configured to acquire the image data and the image processing control information from the image data generating device;

an image quality parameter value acquisition mechanism configured to analyze said image data and acquire an image quality parameter value that indicates an image quality property of said image data;

a standard image quality parameter value correction mechanism configured to analyze said image processing control information, and based on an analysis result correct a standard image quality parameter value predetermined for said image quality parameter; and an image quality adjustment mechanism configured to adjust the image quality of said image data based on said standard image quality parameter value corrected by said standard image quality parameter value correction mechanism and said image quality parameter value acquired by said image quality parameter value acquisition mechanism.

21. An image processing device according to claim 20, wherein:

said standard image quality parameter values are a combination of parameter values selected from a plurality of values for said image quality parameter values, based on said image processing control information.

22. An image processing device according to claim 20, wherein:

said image processing control information includes correction information for at least one item of information relating to contrast, brightness, color balance, saturation, sharpness, memory color, and noise reduction.

23. An image processing device according to claim 20, wherein:

said image processing control information is stored with the image data within one image file.

24. An image processing device for performing image processing on image data that is included in a single image file with image processing control information defining an image quality correction condition in the image processing device, the image processing control information being related to the image data at an image data generating device, said image processing device comprising:

means for acquiring the image data and the image processing control information from the image data generating device;

means for analyzing said image data;

means for acquiring image quality property information that indicates a property pertaining to an image quality of said image data; and means for adjusting the image quality of said image data with both said image processing control information and said acquired image quality property information.

25. The image processing device of claim 24, further comprising:

means for adjusting an image quality of said image data.

26. A computer-executable program, stored on a computer readable medium, for performing image quality adjustment of image data on image data with image processing control information defining an image quality correction condition in an image processing device, the image processing control information being related to the image data at an image data generating device, wherein said computer-executable program includes executable instructions for a computer to perform functions comprising:

acquiring of the image data and the image processing control information from the image data generating device;

analysis of said image data and acquisition of an image quality parameter value that indicates image quality properties of said image data;

analysis of said image processing control information, and based on an analysis result, correcting a standard image quality parameter value predetermined for said image quality parameter; and adjustment of the image quality of said image data based on said corrected standard image quality parameter value and said acquired image quality parameter value.

27. An image pick-up device generating image data for use in an output device that is separate from said image pick-up device and that outputs an image based on image data subjected to image quality adjustment processing, said image pick-up device comprising:

an image data input mechanism configured to receive image data to subsequently be output to said output device;

an image quality adjustment processing condition designating mechanism configured to designate a condition for image quality adjustment processing of said image data performed by said output device;

an image quality adjustment data generation mechanism configured to generate image quality adjustment data, based on said condition for image quality adjustment processing in said output device and said condition designated by said image quality adjustment processing condition designating mechanism; and an image data output mechanism configured to associate the input image data and the image quality adjustment data and output said input image data associated with the image quality adjustment data to a memory.

28. An image pick-up device according to claim 27, wherein:

said image quality adjustment data is data for correcting a standard image quality parameter used as a basis for image quality adjustment processing in image quality adjustment processing by said output device.

29. An image pick-up device according to claim 27, wherein:

said image quality adjustment data is a standard image quality parameter value used as a standard value for image quality adjustment processing in image quality adjustment processing by said output device.

30. An image pick-up device according to claim 27, wherein:

said image quality adjustment data is a combination of a plurality of standard image quality parameter values corresponding to image quality parameters representing image quality of said image data, and used as standard values for image quality adjustment processing by said output device.

31. An image pick-up device according to claim 27, wherein:

said image quality adjustment data is data for designating an appropriate level of correction for correcting said image data calculated on the basis of a standard image quality parameter value used as a standard value for image quality adjustment processing by said output device and an image quality parameter value representing image quality of said image data.

32. An image pick-up device according to claim 27, wherein:

said image quality adjustment data is data for designating a trend for correction of a plurality of standard image quality parameter values, corresponding to image quality parameters representing image quality of said image data, and used as standard values for image quality adjustment processing by said output device.

33. An image pick-up device according to claim 32, wherein:

said image quality adjustment data includes data designating trends for correction of said standard image quality parameter values relating at least to contrast, brightness, color balance, saturation, sharpness, memory color, and noise reduction, for each said photographic condition.

34. An image pick-up device according to claim 27, wherein said image quality adjustment processing condition designation mechanism comprising:

a display device configured to display said image quality adjustment processing condition; and a determination mechanism configured to select and determine said image quality adjustment processing condition.

35. An image pick-up device according to claim 27, wherein:

said image data output mechanism is configured to store the image data with said image quality adjustment data within one image file.

36. An image pick-up device according to claim 27, further comprising:

an image generator configured to generate image data for output by said output device.

37. An image pick-up device generating image data for use in an output device that is separate from said image pick-up device and that outputs image data subjected to image quality adjustment processing, said image pick-up device comprising:

means for inputting image data for output to said output device;

means for designating a condition for image quality adjustment processing of said image data performed by said output device;

means for generating image quality adjustment data, based on said designated condition for image quality adjustment processing in said output device; and means for outputting a single image file that contains said input image data and image quality adjustment data to a memory.

38. A method of generating image data in an image pick-up device that is separate from an output device, said output device outputting an image based on the image data, comprising steps of:

inputting image data for output to said output device;

designating a condition for image quality adjustment processing of said image data performed by said output device;

generating image quality adjustment data, based on said designated condition for image quality adjustment processing in said output device;

relating said input image data to the image quality adjustment data; and outputting the related image data to a memory.

39. A method according to claim 38 wherein:

said image quality adjustment data is data for correcting a standard image quality parameter used as a basis for image quality adjustment processing in image quality adjustment processing by said output device.

40. A method according to claim 38 wherein said image quality adjustment data is a standard image quality parameter value used as a standard value for image quality adjustment processing in image quality adjustment processing by said output device.

41. A method according to claim 38, wherein:

said image quality adjustment data is a combination of a plurality of standard image quality parameter values corresponding to image quality parameters representing image quality of said image data, and used as standard values for image quality adjustment processing by said output device.

42. A method according to claim 38, wherein:

said image quality adjustment data is data for designating an appropriate level of correction for correcting said image data calculated based on a standard image quality parameter value used as a standard value for image quality adjustment processing by said output device and an image quality parameter value representing image quality of said image data.

43. A method according to claim 38, wherein:

said image quality adjustment data is data for designating a trend for correction of a plurality of standard image quality parameter values, corresponding to image quality parameters representing image quality of said image data, and used as standard values for image quality adjustment processing by said output device.

44. A method according to claim 38, wherein is said method is computer-implemented method.

45. A method according to claim 44, wherein:

said image quality adjustment data includes data designating trends for correction of said standard image quality parameter values relating at least to contrast, brightness, color balance, saturation, sharpness, memory color, and noise reduction, for each said photographic condition.

46. A method according to claim 38, further comprising:

displaying said image quality adjustment processing condition; and selecting and determining said image quality adjustment processing condition.

47. A method according to claim 38, further comprising:

storing said image data with the image quality adjustment data within one image file.

48. A method according to claim 38, further comprising:

generating image data for output by said output device.

49. A computer-executable program, stored on a computer readable medium, for generating image data in an image pick-up device that is separate from an output device, said output device outputting an image based on the image data, wherein said computer-executable program includes executable instructions for a computer to perform functions comprising:

acquisition of image data for output to said output device;

designation of a condition for image quality adjustment processing of said image data performed by said output device;

generation of image quality adjustment data based on said designated condition for image quality adjustment processing in said output device;

relation of said acquired image data to image output control data; and output of the related image data to a memory.

50. An image processing system for outputting image data from an image file that includes, in a single file, image data and image processing control information defining image quality correction in the image processing device, the image processing control information being related to the image data at an image data generating device, said image processing system comprising:

an image data generating device including
  means for acquiring said image data,
  means for designating a condition for image quality adjustment processing of said image data,
  means for generating image quality adjustment data based on said condition for image quality adjustment processing, and
  means for generating a single image file that contains said acquired image data and image output control data; and an image processing device including
  means for analyzing said image data and acquiring image quality property information for said image data; and
  means for adjusting the image quality of said image data to reflect said condition for image quality adjustment processing and said image quality property information.

* * * * *